(12) United States Patent
Kawanishi et al.

(10) Patent No.: US 11,675,064 B2
(45) Date of Patent: Jun. 13, 2023

(54) OPTICAL RADAR APPARATUS

(71) Applicant: SHARP KABUSHIKI KAISHA, Sakai (JP)

(72) Inventors: Hidenori Kawanishi, Sakai (JP); Katsuji Iguchi, Sakai (JP); Koji Takahashi, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 788 days.

(21) Appl. No.: 16/618,066

(22) PCT Filed: Apr. 18, 2018

(86) PCT No.: PCT/JP2018/015940
§ 371 (c)(1),
(2) Date: Nov. 27, 2019

(87) PCT Pub. No.: WO2018/221049
PCT Pub. Date: Dec. 6, 2018

(65) Prior Publication Data
US 2021/0124030 A1    Apr. 29, 2021

(30) Foreign Application Priority Data
May 31, 2017  (JP) .............................. JP2017-108757

(51) Int. Cl.
*G01S 7/499*     (2006.01)
*G01S 7/481*     (2006.01)
*G01S 17/89*     (2020.01)

(52) U.S. Cl.
CPC ............ *G01S 7/499* (2013.01); *G01S 7/4813* (2013.01); *G01S 17/89* (2013.01)

(58) Field of Classification Search
CPC ............................... G01S 7/499; G01S 7/4813
See application file for complete search history.

(56) References Cited

U.S. PATENT DOCUMENTS

| 2011/0050885 A1* | 3/2011 | McEldowney ...... G06V 10/145 |
| | | 382/106 |
| 2015/0062555 A1* | 3/2015 | Kim ........................ G01S 17/87 |
| | | 356/4.01 |
| 2017/0166165 A1 | 6/2017 | Schindler et al. |

FOREIGN PATENT DOCUMENTS

| JP | 2002-039716 A | 2/2002 |
| JP | 2015-052506 A | 3/2015 |
| JP | 2015-078953 A | 4/2015 |
| JP | 2016-224021 A | 12/2016 |
| JP | 2017-506756 A | 3/2017 |

OTHER PUBLICATIONS

Niclass et al., "A 0.18-μm CMOS SoC for a 100-m-Range 10-Frame/s 200 96-Pixel Time-of-Flight Depth Sensor", IEEE Journal of Solid-State Circuits, vol. 49, No. 1, Jan. 2014, pp. 315-330.

* cited by examiner

*Primary Examiner* — Thanh Luu
(74) *Attorney, Agent, or Firm* — ScienBiziP, P.C.

(57) ABSTRACT

An SN ratio of light to be received is improved. A polarizing filter (150) that is arranged in a light path extending from an object (11) to a light receiving unit (154) of a ToF sensor (153) and allows transmission of light polarized in a direction vertical to a direction of scanning is provided.

19 Claims, 14 Drawing Sheets

FIG.3

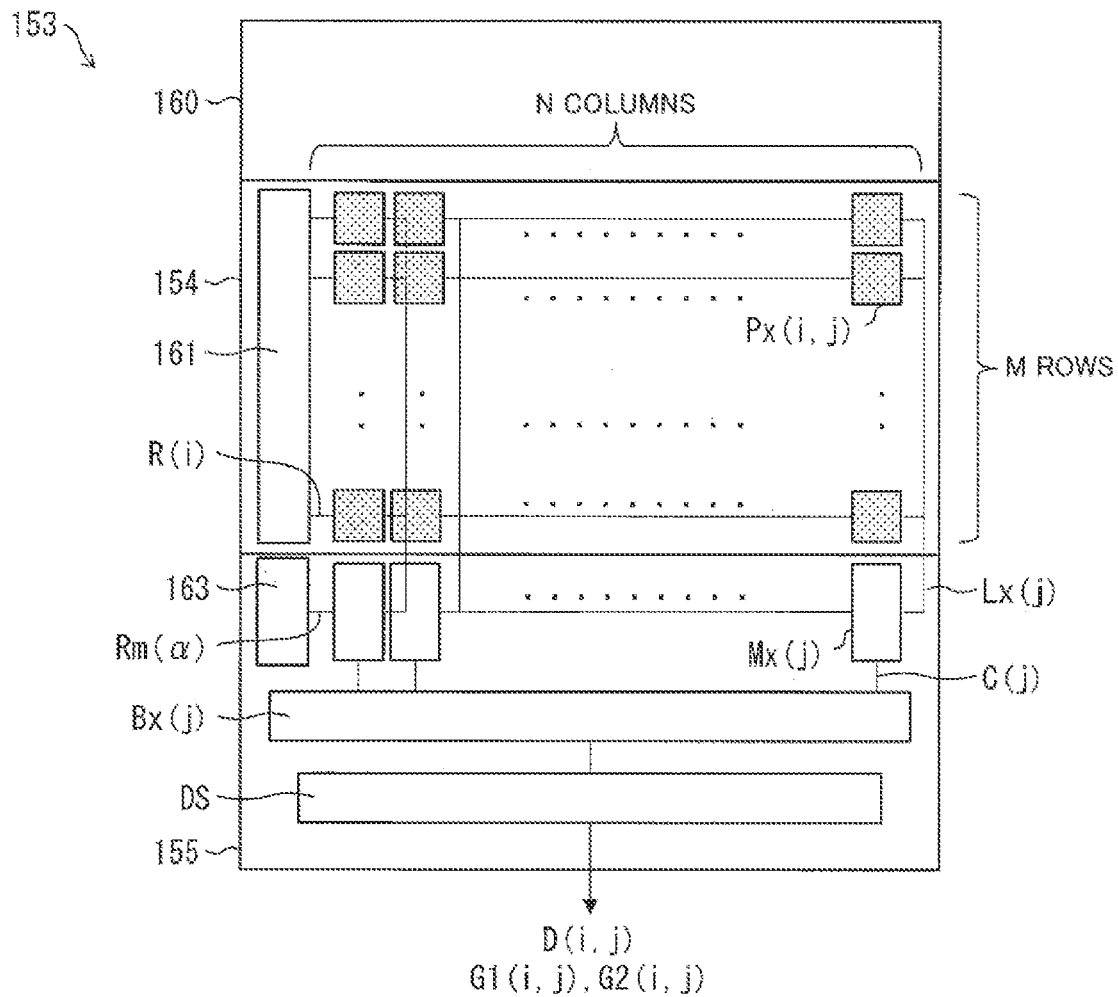

153: ToF SENSOR
154: LIGHT RECEIVING UNIT
155: SIGNAL STORAGE PROCESSING UNIT
160: CONTROL UNIT
161: ROW SELECTION CIRCUIT
163: MEMORY SELECTION CIRCUIT
Bx (j): BUFFER MEMORY
C (j): COLUMN SIGNAL LINE
D (i, j): DISTANCE INFORMATION
DS: SIGNAL PROCESSING CIRCUIT
G1 (i, j), G2 (i, j): TWO-DIMENSIONAL IMAGE INFORMATION
Lx (j): SIGNAL LINE
Mx (j): PIXEL STORAGE ELEMENT
Px (i, j): PIXEL
R (i): ROW SELECTION LINE
Rm (α): MEMORY SELECTION LINE

103: OPTICAL RADAR APPARATUS
110d: PULSE LIGHT ILLUMINATION SYSTEM
122d: LIGHT SOURCE
123d: FAN-LIKE LIGHT RADIATION SYSTEM
140d: LIGHT RECEIVING SYSTEM
150d: POLARIZING FILTER
151: IMAGING OPTICAL SYSTEM
152: OPTICAL BAND-PASS FILTER
153d: ToF SENSOR
154d: LIGHT RECEIVING UNIT
170: EXTERNAL SYSTEM
SP5: LINEARLY POLARIZED LIGHT IN PAPER-FACE VERTICAL DIRECTION

FIG.9

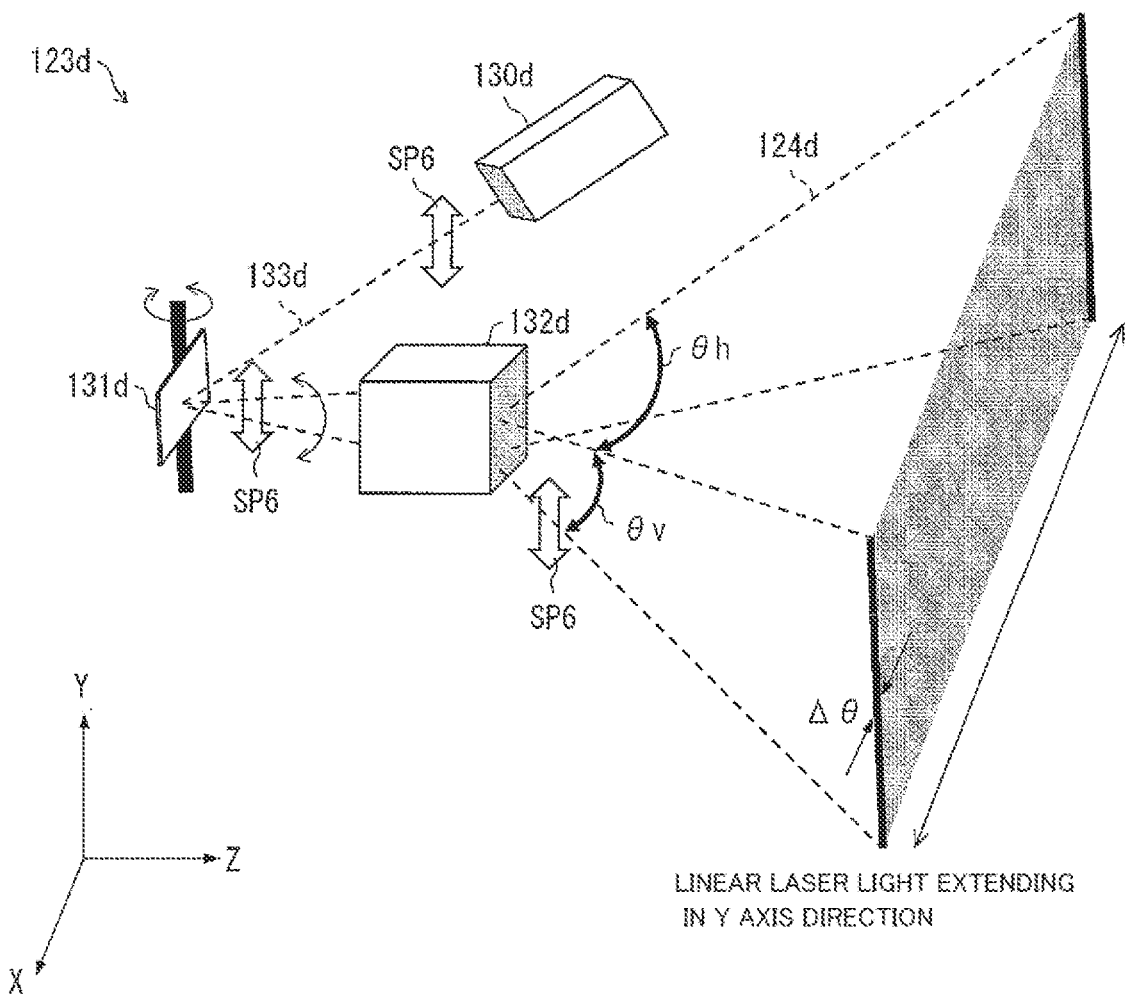

LINEAR LASER LIGHT EXTENDING IN Y AXIS DIRECTION

123d: FAN-LIKE LIGHT RADIATION SYSTEM
124d: FAN-LIKE PULSE LIGHT
130d: COLLIMATE LIGHT GENERATOR
131d: ONE-DIMENSIONAL SCANNING DEVICE
132d: FAN-LIKE BEAM GENERATOR
133d: SPOT LIGHT
SP6: LINEARLY POLARIZED LIGHT IN DIRECTION PARALLEL TO Y AXIS
$\theta h$: HORIZONTAL RADIATION ANGLE
$\theta v$: VERTICAL RADIATION ANGLE
$\Delta \theta$: BEAM THICKNESS

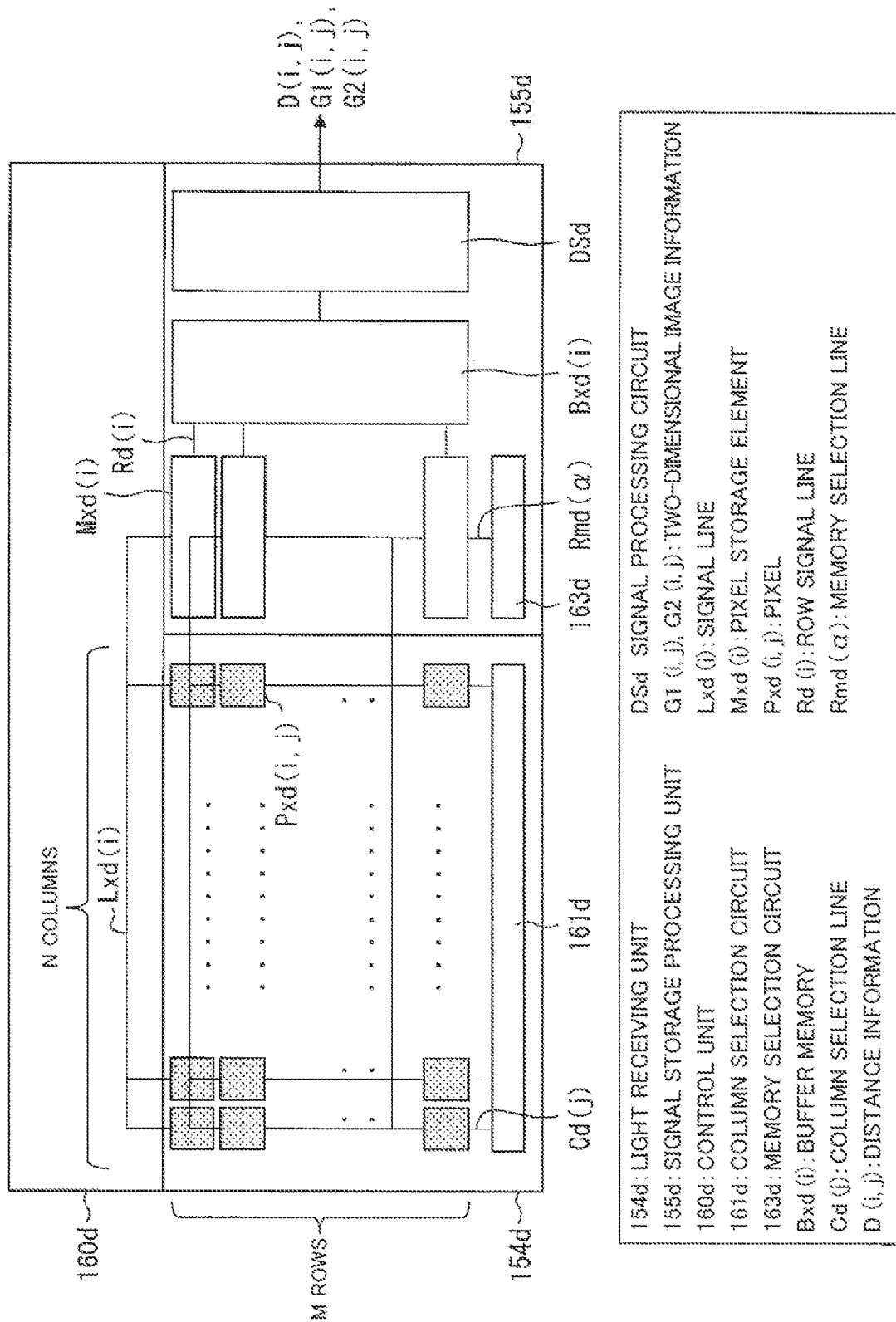

OPTICAL RADAR APPARATUS

TECHNICAL FIELD

The present invention relates to an optical radar apparatus. In particular, the invention relates to as optical radar apparatus by which a three-dimensional image mainly constituted by a two-dimensional image of an object and information of a distance to the object is acquired.

BACKGROUND ART

A three-dimensional image has a concept that includes not only a normal two-dimensional image such as a photograph but also information of a distance to an object within a field of view, and application of peripheral recognition is automobiles, robots, and the—shaped has been spreading in recent years. As a method of measuring distance information with high accuracy, a method of radiating laser light and measuring a flight time (Time-of-flight) until the laser light is reflected by the object and returns therefrom is becoming spread.

A method of radiating laser light to a whole of a field of view includes a scanning type in which a laser beam that is narrowed into a dot shape (refer to NPL 1) or a band shape (refer to PTL 1) is used for scanning with a mirror or the—shaped and a single-radiation type in which a laser beam is spread and radiated almost uniformly over a whole of a field of view. In particular, many scanning types in which strong beam intensity is easily obtained at an object have been developed. The scanning type is expensive and increased in size because it requires a mechanical configuration for performing scanning with the beam. On the other hand, the single-radiation type is easily reduced in size because it does not require a mechanical configuration for scanning, but laser light intensity at the object is weaker as compared to that of the scanning type, so that when a distance to the object is long, signal intensity becomes weak and accuracy of distance measurement is lowered.

In an existing optical radar apparatus, polarization of a laser beam to be radiated or reflection light is not generally controlled. This is because, even when a polarized laser beam is radiated, polarizability is often lost due to reflection by the object, and when only a specific polarized state is detected, signal intensity is reduced by half. On the other hand, an invention in which a polarizer is provided in an optical radar apparatus is also proposed, though the number thereof is small. As an example thereof, an invention (refer to PTL 2) in which polarizers are installed on both of a radiation side and a light receiving side and the two polarizers are arranged differently by 90 degrees to thereby reduce a shielding effect by droplets of steam or the—shaped is proposed. Further, an invention (refer to PTL 3) in which a polarizer is arranged an at least one of a radiation side and a light receiving side and a function similar to that of an optical filter is achieved is also proposed.

CITATION LIST

Patent Literature

PTL 1: Japanese Unexamined Patent Application Publication No. 2015-78953 (published on Apr. 23, 2015)
PTL 2: Japanese Unexamined Patent Application Publication No. 2016-224021 (published on Dec. 28, 2016)
PTL 3: PCT Japanese Translation Patent Publication No. 2017-506756 (published on Mar. 9, 2017)

Non Patent Literature

NPL 1: IEEE JOURNAL OF SOLID-STATE CIRCUITS, VOL. 49, NO. 1, JANUARY 2014, P315-330 "A 0.18-μm CMOS SoC for a 100-m-Range 10-Frame/s 200×96-Pixel Time-of-Flight Depth Sensor." Cristiano Niclass, Mineki Soga, Hiroyuki Matsubara, Masaru Ogawa, and Manabu Kagami

SUMMARY OF INVENTION

Technical Problem

However, a conventional technique described above has a problem that an SN ratio of light to be received is low because of the following reason.

In general, an optical radar apparatus radiates laser to an object, measures a fight time (ToF) by using reflection light thereof, and measures a distance to the object. Thus, with respect to a remote object, light radiation intensity at a surface of the object is inevitably reduced. In particular, in automotive application, since the optical radar apparatus needs to operate even under midday intense sunlight directly on the equator, intense background light causes an interfering factor. Such background light causes a most serious problem when a light path in order of the sun, the surface of the object, and a light receiving unit (optical radar apparatus) satisfies the reflection law of specular reflection. A case where reflection light of such sunlight is directly incident on the light receiving unit generally occurs when the surface is inclined as viewed from the optical radar apparatus. On the other hand, a light radiation unit and the light receiving unit of the optical radar apparatus share an optical system in some cases and are generally arranged so as to be extremely close to each other, so that radiation light and received light of the optical radar apparatus are almost on the same line. Thus, since only weak and diffusive reflection of the radiation light returns from the inclined surface of the object as described above, the background light becomes very great with respect to signal light and a distance is difficult to be measured. Further, such a situation is caused at a part corresponding to an outline of the object, so that a problem that information of the outline part is lost and it also becomes difficult to recognize a shape is also posed.

An aspect of the invention aims to realize an optical radar apparatus capable of improving an SN ratio of light to be received.

Solution to Problem

In order to solve the aforementioned problems, an optical radar apparatus according to an aspect of the invention includes: a light source that emits pulse light; a scanning device that performs scanning in one direction with the pulse light; a beam generator that radiates the pulse light so as to be spread in a plane vertical to the direction of the scanning; a sensor that uses reflection light from an object illuminated with illumination light obtained by the scanning and the radiation and polarized in a direction vertical to the direction of the scanning and that measures a distance to the object; a polarizing filter that is arranged in a light path extending from the object to a light receiving unit of the sensor and allows transmission of light polarized in the direction vertical to the direction of the scanning; a sub sensor that is different from the sensor; and a sub polarizing filter that is arranged in a light path extending from the object to a light receiving unit of the sub sensor and allows transmission of light polarized in a direction parallel to the direction of the scanning. In order to solve the aforementioned problems, an optical radar apparatus according to an aspect of the invention includes: a light source that emits pulse light; a scanning device that performs scanning in one direction with the pulse light; a beam generator that radiates the pulse light so as to be spread in a plane vertical to the direction of the scanning; a sensor that uses reflection light from an object illuminated with illumination light obtained by the scanning and the radiation and polarized in a direction vertical to the direction of the scanning and that measures a distance to the object; and a polarizing filter that is arranged in a light path extending from the object to a light receiving unit of the sensor and allows transmission of light polarized in the direction vertical to the direction of the scanning, wherein the sensor includes: the light receiving unit including a two-dimensional array of pixels; and a pixel storage element, disposed outside the light receiving unit, that stores in time sequence a signal amount of an electric signal outputted by the pixels receiving the reflection light. In order to solve the aforementioned problems, an optical radar apparatus according to an aspect of the invention includes: a light source that emits pulse light; a scanning device that performs scanning in one direction with the pulse light; a beam generator that radiates the pulse light so as to be spread in a plane vertical to the direction of the scanning; a sensor that uses reflection light from an object illuminated with illumination light obtained by the scanning and the radiation and polarized in a direction vertical to the direction of the scanning and that measures a distance to the object; and a polarizing filter that is arranged in a light path extending from the object to a light receiving unit of the sensor and allows transmission of light polarized in the direction vertical to the direction of the scanning, wherein the scanning device is a mirror element having a reflection plane that rotationally moves about one axis, and the pulse light is linearly polarized in a direction parallel to the rotation axis of the reflection plane. In order to solve the aforementioned problems, an optical radar apparatus according to an aspect of the invention includes: a light source that emits pulse light; a scanning device that performs scanning in one direction with the pulse light; a beam generator that radiates the pulse light so as to be spread in a plane vertical to the direction of the scanning; a sensor that uses reflection light from an object illuminated with illumination light obtained by the scanning and the radiation and polarized in a direction vertical to the direction of the scanning and that measures a distance to the object; and a polarizing device that is arranged in a light path extending from the object to a light receiving unit of the sensor and is able to control a polarization direction of light to be transmitted the sensor includes: the light receiving unit including a two-dimensional array of pixels; and a pixel storage element, disposed outside the light receiving unit, that stores in time sequence a signal amount of an electric signal outputted by the pixels receiving the reflection light.

In order to solve the aforementioned problems, an optical radar apparatus according to an aspect of the invention includes: a light source that emits pulse light; a scanning device that performs scanning in one direction with the pulse light; a beam generator that radiates the pulse light so as to be spread in a plane vertical to the direction of the scanning; a sensor that uses reflection light from an object illuminated with illumination light obtained by the scanning and the radiation and polarized in a direction vertical to the direction of the scanning and that measures a distance to the object; and a polarizing device that is arranged in a light path extending from the object to a light receiving unit of the sensor and is able to control a polarization direction of light to be transmitted, wherein the scanning device is a mirror element having a reflection plane that rotationally moves about one axis, and the pulse light is linearly polarized in a direction parallel to the rotation axis of the reflection plane.

Advantageous Effects of Invention

According to an aspect of the invention, it is possible to realize an optical radar apparatus capable of improving an SN ratio of light to be received.

BRIEF DESCRIPTION OF DRAWINGS

FIG. 3 is a schematic view of a ToF sensor that constitutes the optical radar apparatus according to Embodiment 1 of the invention.

FIG. 9 is a schematic view illustrating a configuration of a fan-shaped light radiation system that constitutes the optical radar apparatus according to Embodiment 4 of the invention.

FIG. 10 is a schematic view of a ToF sensor that constitutes the optical radar apparatus according to Embodiment 4 of the invention.

DESCRIPTION OF EMBODIMENTS

Figure 1:
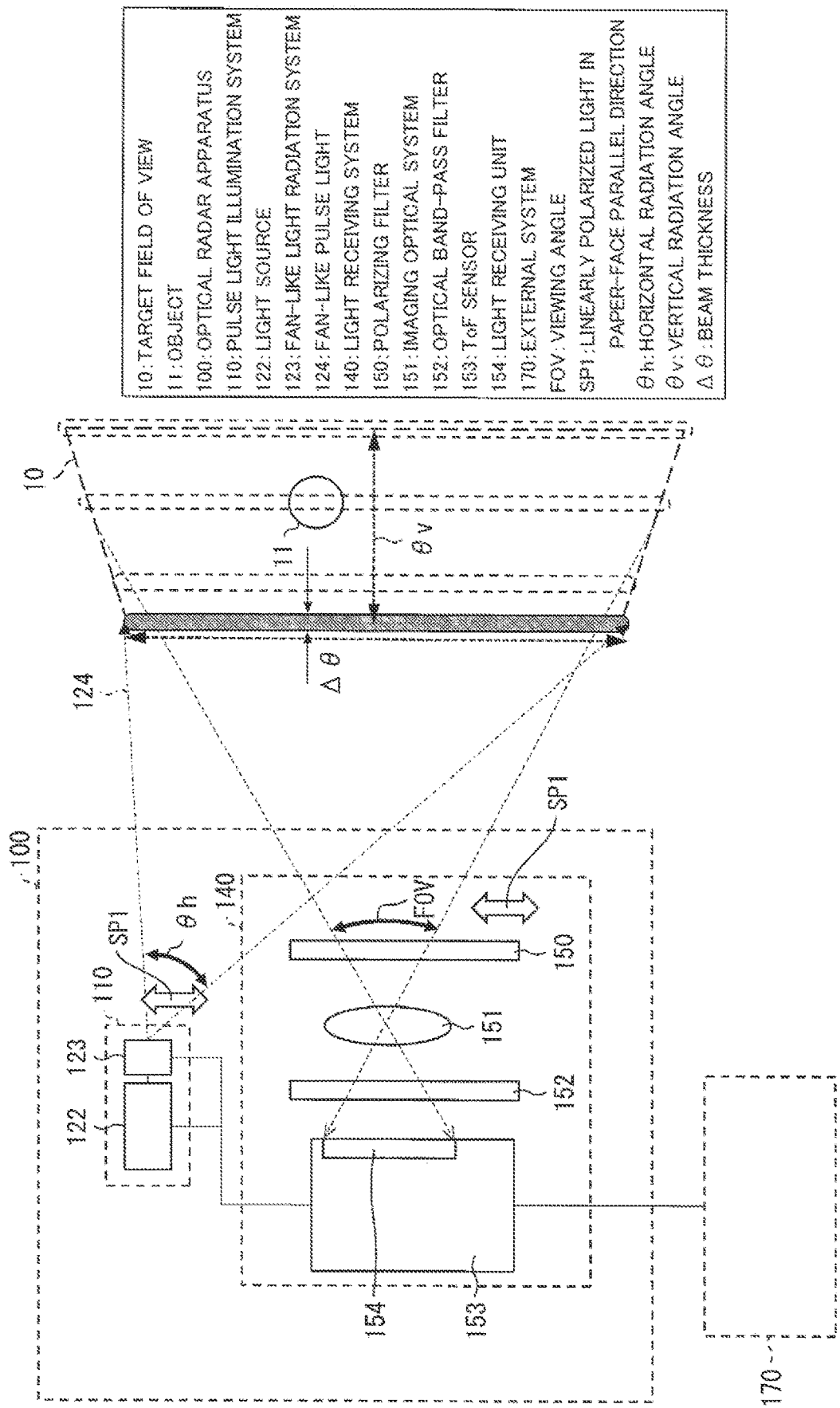
FIG. 1 is a schematic view illustrating a configuration of an optical radar apparatus according to Embodiment 1 of the invention.

Embodiments of the invention will be described with reference to FIGS. 1 to 14. Hereinafter, for convenience of description, a component having the same function as that of a component described in a specific embodiment will be given the same reference sign and description thereof will be omitted in some cases.

Embodiment 1

A configuration of an optical radar apparatus 100 according to Embodiment 1 of the invention will be described with reference to FIGS. 1 to 4. The optical radar apparatus 100 includes a light source 122 that emits pulse light, a one-dimensional scanning device 131 that performs scanning in one direction with the pulse light, a fan-shaped beam generator 132 that radiates the pulse light so as to be spread in a plane vertical to a plane that includes the direction of the scanning, a ToF sensor 153 that measures a distance to an object 11 by using reflection light from the object 11 irradiated with fan-shaped pulse light 124 that is obtained by the scanning and the radiation and is polarized in a direction vertical to the direction of the scanning, and a polarizing filter 150 that is arranged in a light path extending from the object 11 to a light receiving unit 154 of the ToF sensor 153 and allows transmission of the light polarized in the direction vertical to the direction of the scanning.

As illustrated in FIG. 1, the optical radar apparatus 100 includes a pulse light illumination system 110 that radiates the fan-shaped pulse light (illumination light) 124 to a target field of view (region where light is radiated from the pulse light illumination system) 10 and a light receiving system 140 that receives light from at least a part of the target field of view 10. The pulse light illumination system 110 includes at least the light source 122 and a fan-shaped light radiation system 123. The light source 122 emits pulse light. The fan-shaped light radiation system 123 irradiates a whole of the target field of view 10 by performing one-dimensional scanning in a vertical direction with use of the fan-shaped pulse light 124 that is spread in a horizontal direction.

The light receiving system 140 has at least the polarizing filter 150, an imaging optical system 151, an optical band-pass filter 152, and the ToF sensor 153. The imaging optical system 151 images and projects light, which is from at least a part of the target field of view 10, onto the light receiving unit 154 through the optical band-pass filter 152. The ToF sensor 153 has a control unit 160 having a function of controlling the pulse light illumination system 110 and a function of performing communication or the like with an external system 170, and has a signal storage processing unit 155 (refer to FIG. 3). Note that, though the control unit 160 is included in the ToF sensor 153 in the optical radar apparatus 100, the control unit 160 does not need to be mounted in the same chip as the light receiving unit 154 and/or the signal storage processing unit 155 and may be formed in a chip different from them.

In the present embodiment, the light source 122 emits linearly polarized pulse light, the fan-shaped pulse light 124 is linearly polarized in parallel to a fan plane, and the polarizing filter 150 of the light receiving system 140 is arranged so as to allow passage of polarized light (refer to linearly polarized light SP1 in a paper-face parallel direction of FIG. 1) parallel to a polarization direction of the fan-shaped pulse light 124.

(Pulse light illumination system 110)

The fan-shaped pulse light 124 is spread in a fan shape in a horizontal plane and a spread angle thereof is set as a horizontal radiation angle (spread angle of the fan-shaped pulse light in the fan plane) θh. On the other hand, a spread angle in the vertical direction is small and a beam thickness is set as Δθ (full width at half maximum). The horizontal radiation angle θh>> the beam thickness Δθ is provided. When the fan-shaped pulse light 124 is used for scanning within a vertical radiation angle (scanning angle) θv in the vertical direction, the target field of view 10 with the horizontal radiation angle θh that is the spread angle in the horizontal plane and the vertical radiation angle θv that is the spread angle in the vertical direction is able to be sequentially subjected to light radiation. Note that, the horizontal radiation angle θh> the vertical radiation angle θv> the beam thickness Δθ is provided. That is, the horizontal radiation angle θh is larger than the vertical radiation angle θv. Hereinafter, when pieces of fan-shaped pulse light 124 to be radiated at different angles in the vertical direction need to be distinguished from each other, they are described as fan-shaped pulse light 124-1 to fan-shaped pulse light 124-Ns. Ns indicates a total number of times of scanning in the vertical direction.

The fan-shaped pulse light 124 is preferably uniform in the target field of view 10. However, since detection sensitivity in a place where light intensity is strong is high, in a case where there is a place that needs to be particularly gazed in the target field of view 10, the fan-shaped pulse light 124 is also able to have light intensity distribution in which intensity near the place is increased.

Figure 2:
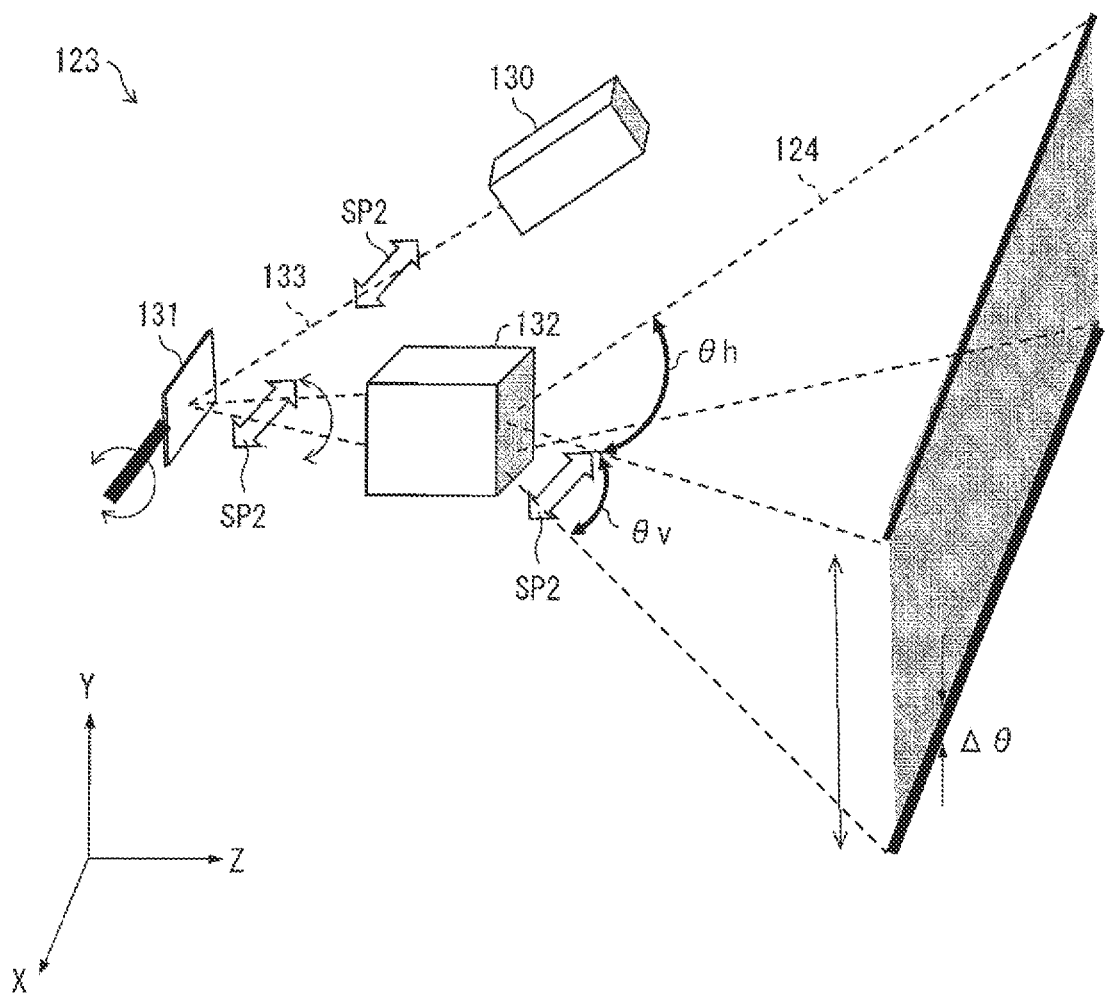
FIG. 2 is a schematic view illustrating a configuration of a fan-shaped light radiation system that constitutes the optical radar apparatus according to Embodiment 1 of the invention.

FIG. 2 is a schematic view illustrating a configuration of the fan-shaped light radiation system 123 that constitutes the optical radar apparatus 100. Note that, in FIG. 2, an X direction, a Y direction, and a Z direction that are three directions vertical to each other are defined. Any direction in an X-Z plane corresponds to horizontal direction and the Y direction corresponds to the vertical direction.

As illustrated in FIG. 2, the fan-shaped light radiation system 123 has at least a collimate light generator 130 that shapes light from the light source 122 into almost parallel spot light 133 (in a Y-Z plane: first plane), the one-dimensional scanning device 131 that performs scanning with the spot light 133 in the vertical direction (Y direction), and the fan-shaped beam generator 132 that makes the spot light, a traveling angle of which in the vertical direction is changed by the one-dimensional scanning device 131, spread into a fan shape. The light source 122 includes, for example, a semiconductor laser chip of edge-emitting type and radiates pulse light polarized in a direction parallel to a semiconductor active layer. In this case, a polarization direction is able to be controlled by a rotation angle of the semiconductor laser chip around an optical axis. In FIG. 2, the active layer of the semiconductor laser chip is arranged in parallel to an X axis. The collimate light generator 130 includes a collimator lens and keeps a polarized state of the light source 122. The one-dimensional scanning device 131 is constituted by an MEMS (Micro Electro Mechanical Systems) mirror element or the like having a reflection plane that rotationally moves about one axis (which is set as the X axis) in the horizontal plane (X-Z plane). The polarization direction (refer to linearly polarized light SP2 in a direction parallel to the X axis of FIG. 2) of the spot light 133 that is incident on a reflection plane of the one-dimensional scanning device 131 is parallel to the reflection plane, so that a polarized state is not changed by reflection. The fan-shaped beam generator 132 includes, for example, a Powell lens. For example, the spot light 133 whose diverging angle is about 1.0 degree and whose diameter at an entry of the Powell lens with an aperture of 8.9 mm is about 3 mm is formed by the collimate light generator 130 and laser light is used for scanning at ±10 degrees with respect to the horizontal plane by the one-dimensional scanning device 131 constituted by the MEMS mirror element. Since the Powell lens radiates the laser light at the horizontal radiation angle θh=90 degrees and the beam thickness Δθ=1 degree, the fan-shaped pulse light 124 is able to be radiated in a range with the horizontal radiation angle θh=90 degrees and the vertical radiation angle θv=20 degrees. With the foregoing configuration, the pulse light that is polarized in parallel to the fan plane is able to be radiated to the whole of the target field of view 10.

The MEMS mirror element is, for example, an electromagnetic type, which changes an angle of a mirror by controlling an amount of a flowing current. In an electrostatic or piezoelectric type, the angle of the mirror is able to be changed by controlling an applied voltage. A configuration for controlling the one-dimensional scanning device 131 is included in the ToF sensor 153 (control unit 160 described later). Synchronous control of the angle of the mirror and the light receiving system 140 is performed so that a signal from the object 11 irradiated with the fan-shaped pulse light 124 is able to be detected. The one-dimensional scanning device 131 may be constituted by a polygon mirror, a liquid crystal waveguide system, or the like other than the MEMS mirror element.

It is preferable that the light source 122 generates linearly polarized pulse light by using the semiconductor laser chip as described above and directly outputs the pulse light because there is no loss of light. However, the light source 122 may be a light source that emits light in a non-polarized state and then makes the light in a linearly polarized state by causing the light to pass through a polarizing filter or a polarizing splitter, and thereby generates linearly polarized pulse light. The light source 122 is a light source capable of emitting laser or pulse light like an LED (Light Emitting Diode), and preferably emitting an infrared ray with a wavelength of about 700 nm to 1000 nm. Further, the light source 122 preferably has a narrow light emission wavelength band and a light emission peak wavelength whose temperature fluctuation is reduced, and infrared laser is preferable. In particular, the light source 122 is preferably a VCSEL (Vertical Cavity Surface Emitting LASER) that has a narrow light emission wavelength band and a light emission peak wavelength whose temperature fluctuation is reduced. Though not described in FIG. 1, a temperature control circuit that performs temperature control of the light source 122 may be added to the optical radar apparatus 100 in order to suppress the temperature fluctuation of the light emission peak wavelength.

The light source 122 emits pulse light in synchronization with the ToF sensor 153. Light emission intensity and/or a pulse width (half width of a light emission time) may be variable. Here, the pulse width of the pulse light is about 1 nsec to several hundreds nsec Peak power of the pulse light is several W to several hundreds W.

The optical radar apparatus 100 acquires data of 30 frames every second, and when pixel resolution of each of the frames is 0.5 degrees and the vertical radiation angle θv is 20 degrees, 40 pieces of fan-shaped pulse light 124-1 to 124-40 whose travelling angles in the vertical direction are different are radiated in one frame, for example. A time allocated to radiation of fan-shaped pulse light 124-K is 1/1200 second, and in this time, an angle of the reflection plane of the one-dimensional scanning device 131 is changed to a setting value and pulse light is emitted from the light source 122. In a case where a pulse light emission frequency is 190 kHz, each fan-shaped pulse light 124-K radiates 158 (=190,000/30/40) pulses to the object 11.

(Light receiving system 140)

The imaging optical system 151 is generally a lens. In accordance with a size of the light receiving unit 154 and a viewing angle FOV, a focal distance and an F-number are able to be appropriately selected. The imaging optical system 151 preferably has a high transmittance and a small aberration at a central wavelength of the optical band-pass filter 152 described later. Though FIG. 1 illustrates a lens as the imaging optical system 151, the imaging optical system 151 may be a reflective optical system other than the lens. The polarizing filter 150 is arranged in a front surface of the imaging optical system 151. The polarizing filter 150 allows transmission of light with polarization parallel to the fan-shaped pulse light 124. Background light not in a band is preferably reduced by arranging the optical band-pass filter 152 in a light path extending from the polarizing filter 150 to the light receiving unit 154. Note that, a polarization direction of the polarizing filter 150 is essentially the same direction as the polarization direction of the fan-shaped pulse light 124, but due to a variation in manufacturing of the pulse light illumination system 110 and/or the light receiving system 140, a variation in manufacturing for assembling them in the optical radar apparatus 100, or the like, a slight deviation (about ± several degrees) may be generated in the polarization directions of both of them. Even in such a case, however, an effect of suppressing powerful background light with polarization in a direction orthogonal to the polarization direction of the polarizing filter 150 is still effective.

The optical band-pass filter 152 has a transmission band in a band of a fixed width with a wavelength peak of the pulse light as a center. A width (full width at half maximum of wavelength distribution of the transmittance) of the transmission band is several nm to several tens nm and is preferably about 10 nm to 20 nm. In general, in a case of operation outdoors, an operation temperature range is widened and a peak wavelength of the pulse light changes with temperature, so that distribution of the pulse light needs to fall within the transmission band at least in the operation temperature range. In a case of the VCSEL, a temperature shift of a peak wavelength is about 0.07 nm/degree, a half width of a light emission peak is about 1 nm, and a temperature shift of a central wavelength of the transmission band of the optical band-pass filter 152 is 0.025 nm/degree. Thus, even in consideration of a temperature zone from 85° C. to −40° C., a relative wavelength shift between the peak wavelength and the central wavelength of the transmission band is about 5.6 nm and the optical band-pass filter 152 with the transmission band of about 10 nm is usable. The optical band-pass filter 152 may be incorporated inside the imaging optical system 151.

(ToF sensor 153)

FIG. 3 is a schematic view of the ToF sensor 153 that constitutes the optical radar apparatus 100. The ToF sensor 153 has, in addition to the light receiving unit 154, the signal storage processing unit 155 and the control unit 160.

The light receiving unit 154 of the ToF sensor 153 has pixels Px (i, j) arranged in a two-dimensional matrix of M rows and N columns, and a light signal from the target field of view 10 is projected by the imaging optical system 151 onto the two-dimensional matrix of the M rows and the N columns. Not all the pixels Px (i, j) are activated at a time. Since the pulse light radiated to the target field of view 10 is the fan-shaped pulse light 124, only pixels in a row K corresponding to the fan-shaped pulse light 124-K are activated. For convenience, the fan-shaped pulse light 124 is numbered from 1 to Ns (=M) from a lowermost part to an uppermost part and i of a corresponding pixel Px (i, j) is numbered from 1 to N from an uppermost part to a lowermost part. Such correspondence is appeared because their orders are reversed to each other via the imaging optical system 151. This is able to be changed depending on a property of the imaging optical system 151. That is, when the fan-shaped pulse light 124-K is radiated, a pixel Px (K, j) is activated. The activation of the pixel Px (K, j) means that an output signal of at least the pixel Px (K, j) is transmitted to the signal storage processing unit 155. Further, supply of a power source to another pixel Px (i, j) may be stopped so that the power source is supplied only to the pixel Px (K, j).

As a circuit by which the pixel Px (K, j) of the row K corresponding to the fan-shaped pulse light 124-K is selected, a row selection circuit 161 is provided in the light receiving unit 154. Further, a row selection line R(i) that is a signal line transmitting a signal of the row selection circuit 161 to each of the pixels Px (i, j) is provided. The row selection line R (i) is not limited to a single signal line and may be a plurality of signal lines that are different in polarity and/or voltage. In synchronization with an operation of the one-dimensional scanning device 131 of the fan-shaped light radiation system 123, the row selection circuit 161 selects the row K to be activated. A signal for synchronization is generated from the control unit 160. The row selection circuit 161 may control the pixels Px (i, j), for example, so that only an output of each of pixels Px (K, j) (j=1 to N) is connected to a signal line Lx (j) or may control a switch (not illustrated) so that power source VSPAD and/or Vcc is supplied only to each of the pixels Px (K, j) (j=1 to N), or may perform both of them.

The signal storage processing unit 155 has at least one pixel storage element Mx (j) corresponding to each column j and the pixel storage element Mx (j) is connected by the respective pixels Px (i, j) and the signal line Lx (j). The pixel storage element Mx (j) receives, through the signal line Lx (j), an electric signal output by the pixel Px (K, j) upon reception of light and stores a signal amount in time sequence. The signal storage processing unit 155 further has a buffer memory Bx (j), a column signal line C (j), and a signal processing circuit DS. Data accumulated in the pixel storage element Mx (j) is copied to the buffer memory Bx (j) through the column signal line C (j) at a defined timing. The signal processing circuit DS calculates and outputs at least distance information D (K, j), two-dimensional image information G1 (K, j), and two-dimensional image information G2 (K, j) on the basis of information of the buffer memory Bx (j). The two-dimensional image information G1 (i, j) and the two-dimensional image information G2 (i, j) are respectively able to be two-dimensional image information by background light and two-dimensional image information by reflection light of the pulse light, but are not limited thereto. The signal storage processing unit 155 may have a memory selection circuit 163 and a memory selection line Rm (α) that are used to select a part of the pixel storage element Mx (j). In a case where the pixel storage element Mx (j) outputs a signal to the column signal line C (j), when all outputs are output in parallel, a large amount of wires are required. Therefore, by reading the time sequential signal amount stored in the pixel storage element Mx (j) one by one, the number of wires is able to be reduced.

The signal storage processing unit 155 of the ToF sensor 153 may have various configurations. Various systems are also cited for a signal generated by a pixel and examples thereof include a circuit that handles the signal in an analog state as it is and a circuit that handles the signal digitizing the signal. Further, a system of measuring a flight time also has various systems such as a direct method, an indirect method, a phase shift method, and TCSPC (Time-Correlated-Single-Photon-Counting), and any system is able to be adopted in the invention. In addition, instead of the light receiving unit 154 in the two-dimensional array as described above, a ToF element may be arranged in a line corresponding to one row so that scanning is performed mechanically in synchronization with the one-dimensional scanning device 131.

(Explanation of effect)

Figure 4:
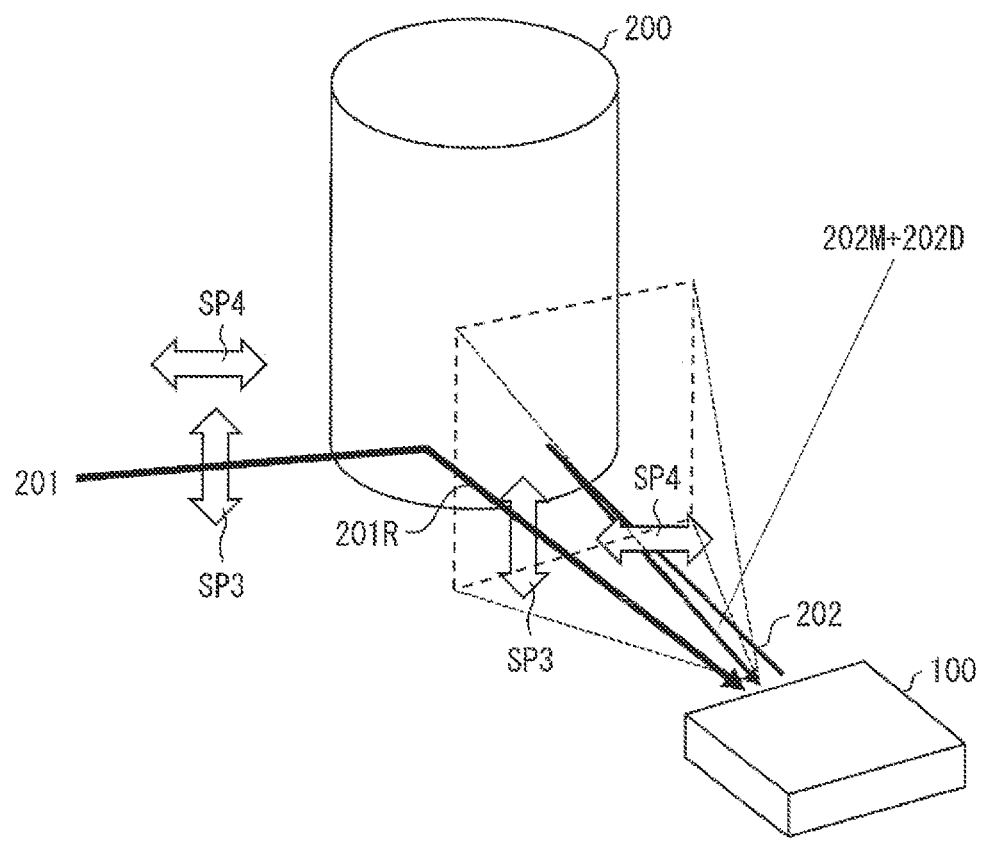
FIG. 4 is a schematic view for explaining interfering specular reflection light of sunlight in the optical radar apparatus according to Embodiment 1 of the invention.

An effect by the optical radar apparatus 100 will be described with reference to FIGS. 1 and 4. FIG. 4 is a schematic view for explaining reflection light 201R that is interfering specular reflection light of sunlight 201 in the optical radar apparatus 100. Note that, though the sunlight 201 is exemplified as a light source of background light here, the same is also applied to another powerful light source.

There are many support posts, such as a signal, a sign, and a guardrail, on a road. Moreover, a curved surface that is continuous in an up-down direction exists in a vehicle body of an automobile or bicycle. As a model of the curved surface that extends in the up-down direction, a column 200 of FIG. 4 is considered. Angle resolution of the optical radar apparatus 100 is not higher than that of a normal imager, and a part of the object 11 corresponding to one pixel has several cm to several tens cm, so that one pixel may cover a whole of such a curved surface and take light from various directions. The light illumination system and the light receiving system of the optical radar apparatus are generally arranged so as to be extremely close to each other (or share the optical system in some cases), so that radiation light and received light of the optical radar apparatus are almost on the same line. Thus, as illustrated in FIG. 4, reflection light of pulse light 202 includes specular reflection light 202M and diffusive reflection light 202D, the specular reflection light 202M keeps polarization of the pulse light 202, and the diffusive reflection light 202D loses the polarization. On the other hand, in a time zone (for example, before 9 a.m. or after 3 p.m.) in which the altitude of the sun is relatively low, there is a case where light such as the sunlight 201 is incident on the curved surface at a great incidence angle and the reflection light 201R is incident on the optical radar apparatus 100. It is known that, in such reflection at the great incidence angle, specular reflection is stronger as compared to vertical incidence and the light is strongly polarized in a direction parallel to a reflection plane. Thus, since such reflection light 201R is strongly polarized in the vertical direction, the polarizing filter 150 that is provided in the horizontal direction is arranged in the light receiving system 140, so that the reflection light 201R is able to be significantly reduced. In a case where the object 11 is not a complete column 200 or the object 11 is inclined, for example, an ideal situation as in FIG. 4 is not provided. However, the reflection light 201R that is generated at the curved surface of the object 11 extending in the vertical direction is polarized in the direction parallel to the reflection plane, so that a polarization direction thereof is almost the vertical direction (refer to linearly polarized light SP3 is the vertical direction of FIG. 4). Thus, by arranging the polarizing filter 150 that is provided in the horizontal direction in the light receiving system 140, the reflection light 201R is able to be reduced significantly, though not being able to be cut completely. In a case where the pulse light 202 is polarized in the horizontal direction (refer to linearly polarized light SP4 parallel to the horizontal plane of FIG. 4), the specular reflection light 202M is finally polarized in the horizontal direction and light receiving efficiency is not lowered. Though the diffusive reflection light 202D loses the polarizability of the pulse light, even in a case (worst case) of completely losing the polarizability, a light receiving amount of the ToF sensor 153 is ½ as compared to a case where no polarizing filter 150 is provided. An SN ratio is remarkably improved in such a case because strong background light by the specular reflection of the sunlight 201 is reduced to a fraction or less. On the other hand, in a case where there is no strong background light by the specular reflection of the sunlight 201, the background light is not polarized, so that the light receiving amount of the ToF sensor 153 is reduced by half by the polarizing filter 150. Accordingly, a ratio of the reflection light of the pulse light 202 and the background light is improved as compared to a case where the pulse light 202 is not polarized. A degree of the improvement increases as a component of the specular reflection of the pulse light 202 increases.

Embodiment 2

Figure 5:
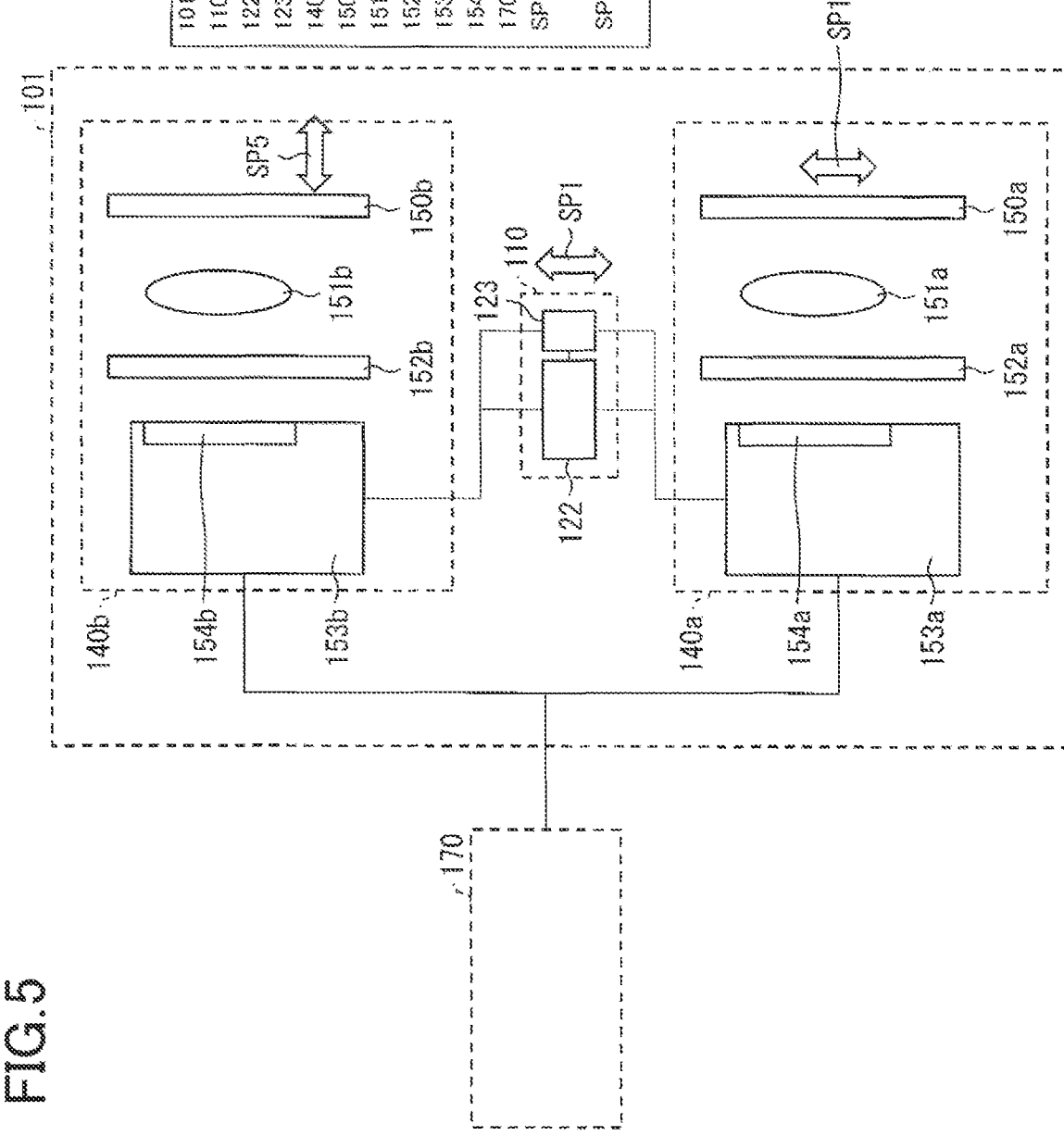
FIG. 5 is a schematic view illustrating a configuration of an optical radar apparatus according to Embodiment 2 of the invention.
Figure 6:
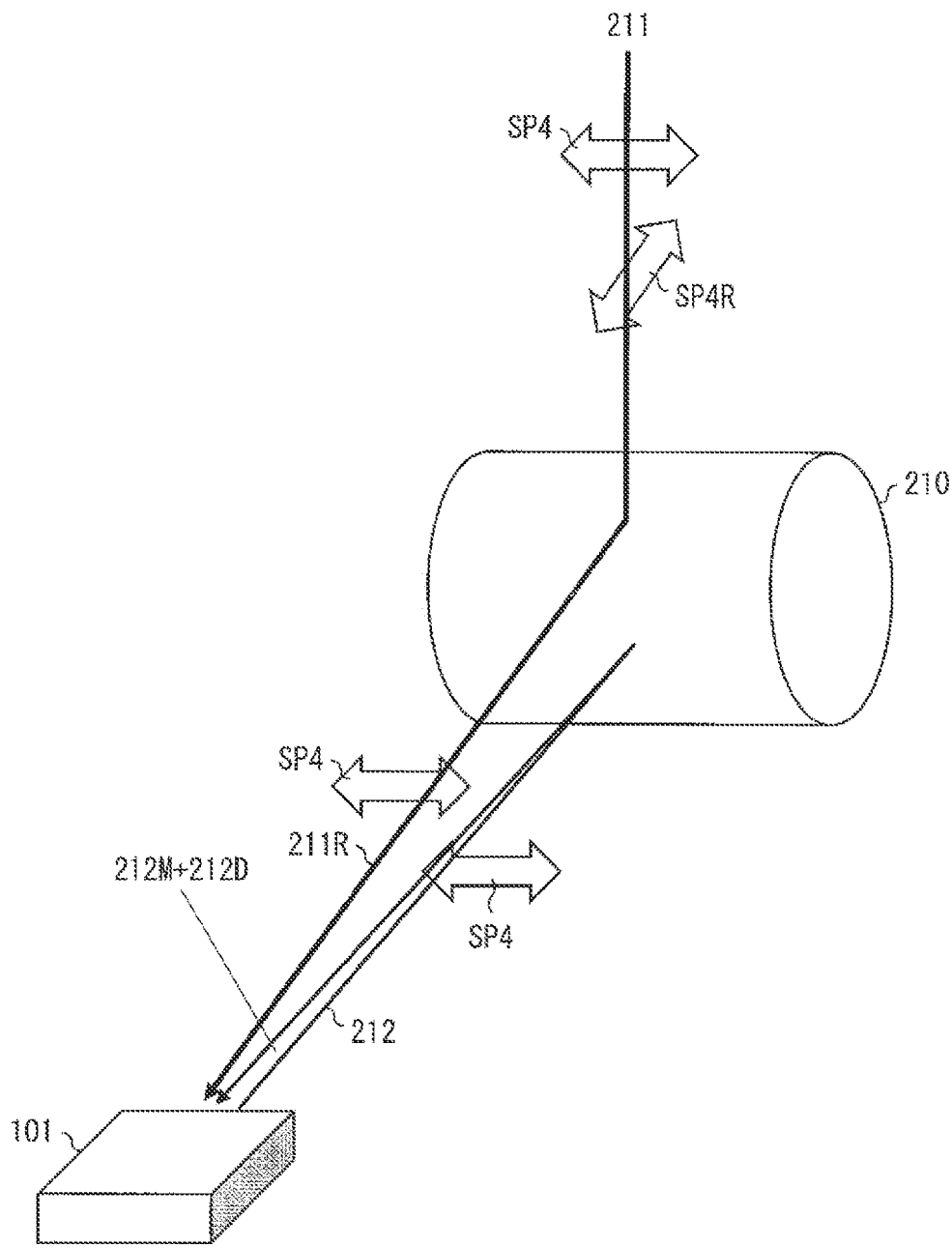
FIG. 6 is a schematic view for explaining interfering specular reflection light of sunlight in the optical radar apparatus according to Embodiment 2 of the invention.

FIG. 5 is a schematic view illustrating a configuration of an optical radar apparatus 101 according to the present embodiment. FIG. 6 is a schematic view for explaining reflection light 211R that is interfering specular reflection light of sunlight 211 in the optical radar apparatus 101. The optical radar apparatus 101 of the present embodiment is different from the optical radar apparatus 100 of Embodiment 1 in terms of including two systems of a light receiving system 140a and a light receiving system 140b as illustrated in FIG. 5. The difference lies in that the light receiving system 140a has a polarizing filter 150a through which light that is polarized in the same direction as the polarization direction of the fan-shaped pule light 124 (refer to FIG. 1), in other words, light of the linearly polarized light SP1 in the paper-face parallel direction is transmitted, and that the light receiving system 140b has a polarizing filter (sub polarizing filter) 150b through which light whose polarization direction is different by 90 degrees, in other words, light of linearly polarized light SP5 in a paper-face vertical direction is transmitted. The light receiving systems 140a and 140b are the same as the light receiving system 140 of the optical radar apparatus 100 in the other points. That is, a ToF sensor 153a that includes an imaging optical system 151a, an optical band-pass filter 152a, and a light receiving unit 154a has a similar configuration to that of the ToF sensor 153 that includes the imaging optical system 151, the optical band-pass filter 152, and the light receiving unit 154. Similarly, a ToF sensor (sub sensor) 153b that includes an imaging optical system 151b, an optical band-pass filter 152b, and a light receiving unit 154b has a similar configuration to that of the ToF sensor 153 that includes the imaging optical system 151, the optical band-pass filter 152, and the light receiving unit 154. Moreover, a column 210, the sunlight 211, the reflection light 211R, pulse light 212, specular reflection light 212M, and diffusive reflection light 212D in FIG. 6 respectively correspond to the column 200, the sunlight 201, the reflection light 201R, the pulse light 202, the specular reflection light 202M, and the diffusive reflection light 202D in FIG. 4.

The light receiving system 140a is used to reduce the reflection light 201R from the sun at the low altitude with respect to the object 11 (refer to FIG. 1) extending in the vertical direction as described in Embodiment 1. However, the light receiving system 140a that performs illumination by the pulse light 212 polarized in the horizontal direction and receives the light through the polarizing filter 150a in the same direction is not able to reduce the reflection light 211R of the sunlight 211 in a curved surface that extends in the horizontal direction as illustrated in FIG. 6. Such a situation is caused, for example, when light from the sun at its meridian altitude is reflected by an end of a horizontal plane of a vehicle in front. Such reflection light 211R is able to be prevented by the light receiving system 140b in which the polarization direction of the polarizing filter 150b is set to the vertical direction. Thus, in a time zone before or after noon in which the altitude of the sun is high, by using the light receiving system 140b, intense specular reflection that is caused by the curved surface extending in the horizontal direction and the sun at the high altitude is able to be reduced and the SN ratio is able to be improved. That is, by properly using any of the two light receiving system 140a and light receiving system 140b in accordance with the altitude of the sun or a time zone, the intense reflection light 211R of the sunlight 211 is able to be suppressed throughout a day.

Note that, in rainy weather, the reflection light 211R by the sunlight 211 does not need to be suppressed, so that the light receiving system 140b is also able to be used to suppress reflection of the pulse light 212 due to raindrops.

The present configuration has an advantage that the reflection right 211R that causes an interfering factor is able to be suppressed regardless of fine weather or rainy weather and a distance is able to be measured without lowering accuracy.

Embodiment 3

Figure 7:
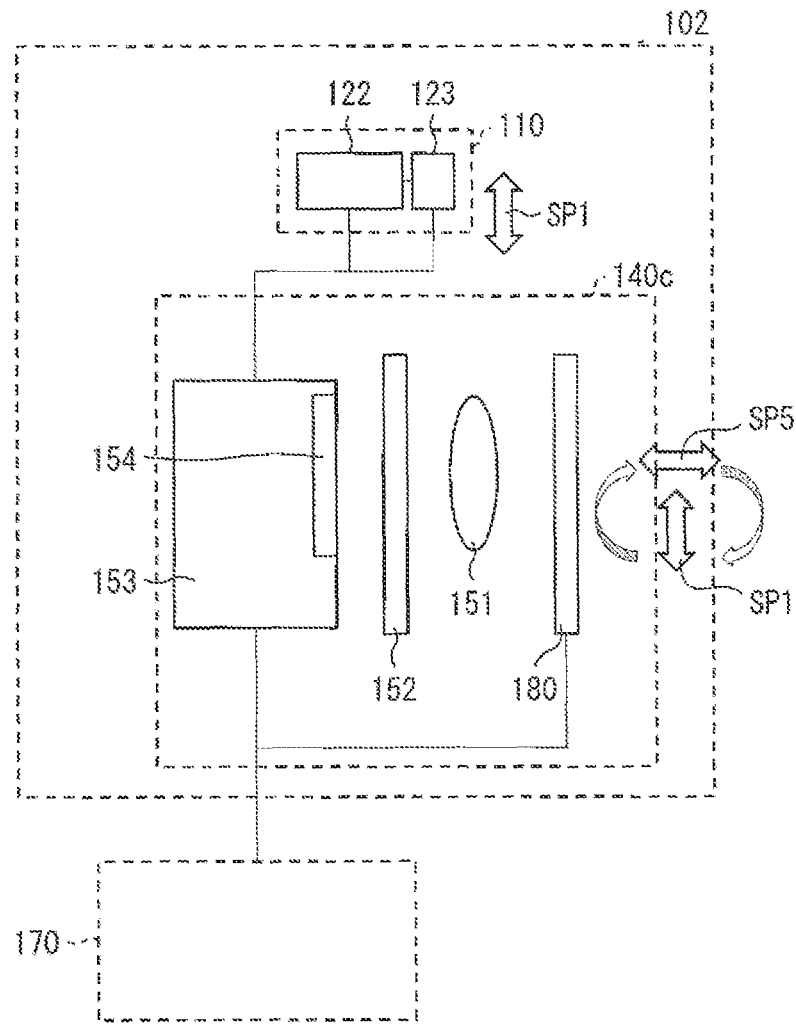
FIG. 7 is a schematic view illustrating a configuration of an optical radar apparatus according to Embodiment 3 of the invention.

FIG. 7 is a schematic view illustrating a configuration of an optical radar apparatus 102 according to the present embodiment. The present embodiment aims to achieve the same effect as that of Embodiment 2 and the optical radar apparatus 102 is different from that of Embodiment 1 in that one system of a light receiving system 140c has a polarizing device 180 capable of changing a polarization direction as illustrated in FIG. 7. The light receiving system 140c is the same as the light receiving system 140 of the optical radar apparatus 100 in the other points.

The polarizing device 180 is able to be constituted by, for example, a polarizer through which light that is linearly polarized in one direction is transmitted and a rotation mechanism that mechanically rotates the polarizer. Alternatively, the polarizing device 180 may be a combination of a polarizer and a device that change the polarization direction by 90 degrees by applying a voltage like a liquid crystal polarization rotator, for example. Note that, the polarizing device 180 is placed in front of the imaging optical system 151 in FIG. 7, but may be at any place frontward the ToF sensor 153. Further, for example, the polarizing device 180 may be constituted by a plurality of units so as to be divided in the light receiving system 140c in such a manner that a polarizer is arranged in a surface of the light receiving unit 154 and a liquid crystal polarization rotator is arranged frontward the imaging optical system 151.

There is an advantage that, by using such a polarizing device 180 capable of controlling the polarization direction of the light to be transmitted, the pulse light polarized in the horizontal direction is radiated and the polarization direction of the reflection light received by the ToF sensor 153 is controlled in accordance with season, a time zone, and/or weather, so that the background light that causes an interfering factor is suppressed and a distance is able to be measured without lowering accuracy.

Embodiment 4

Figure 8:
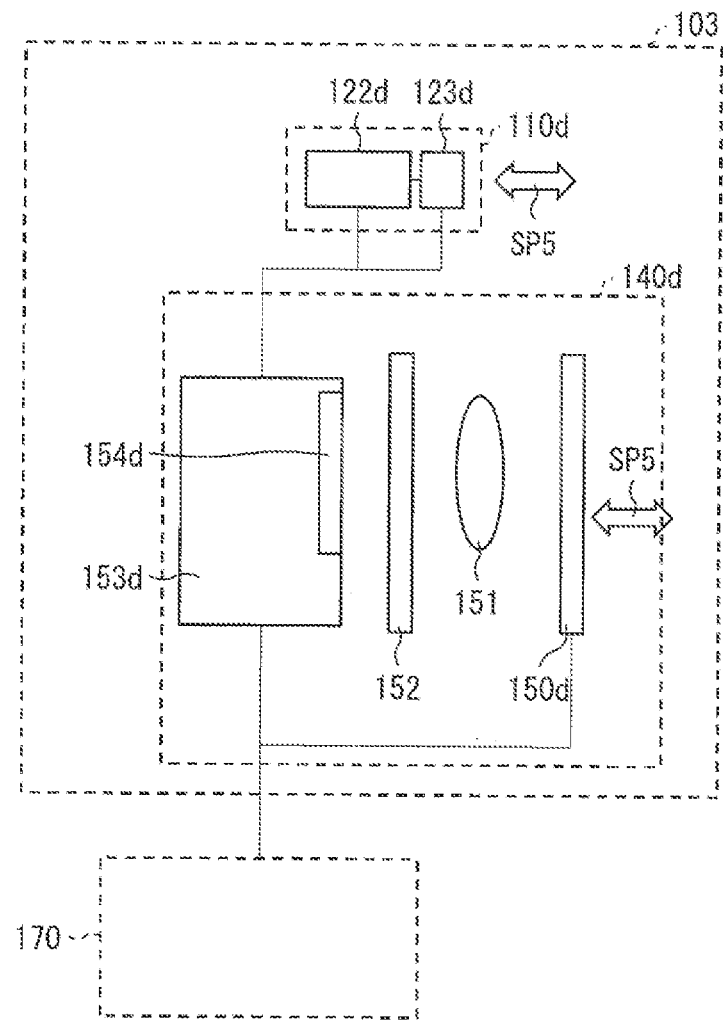
FIG. 8 is a schematic view illustrating a configuration of an optical radar apparatus according to Embodiment 4 of the invention.
Figure 11:
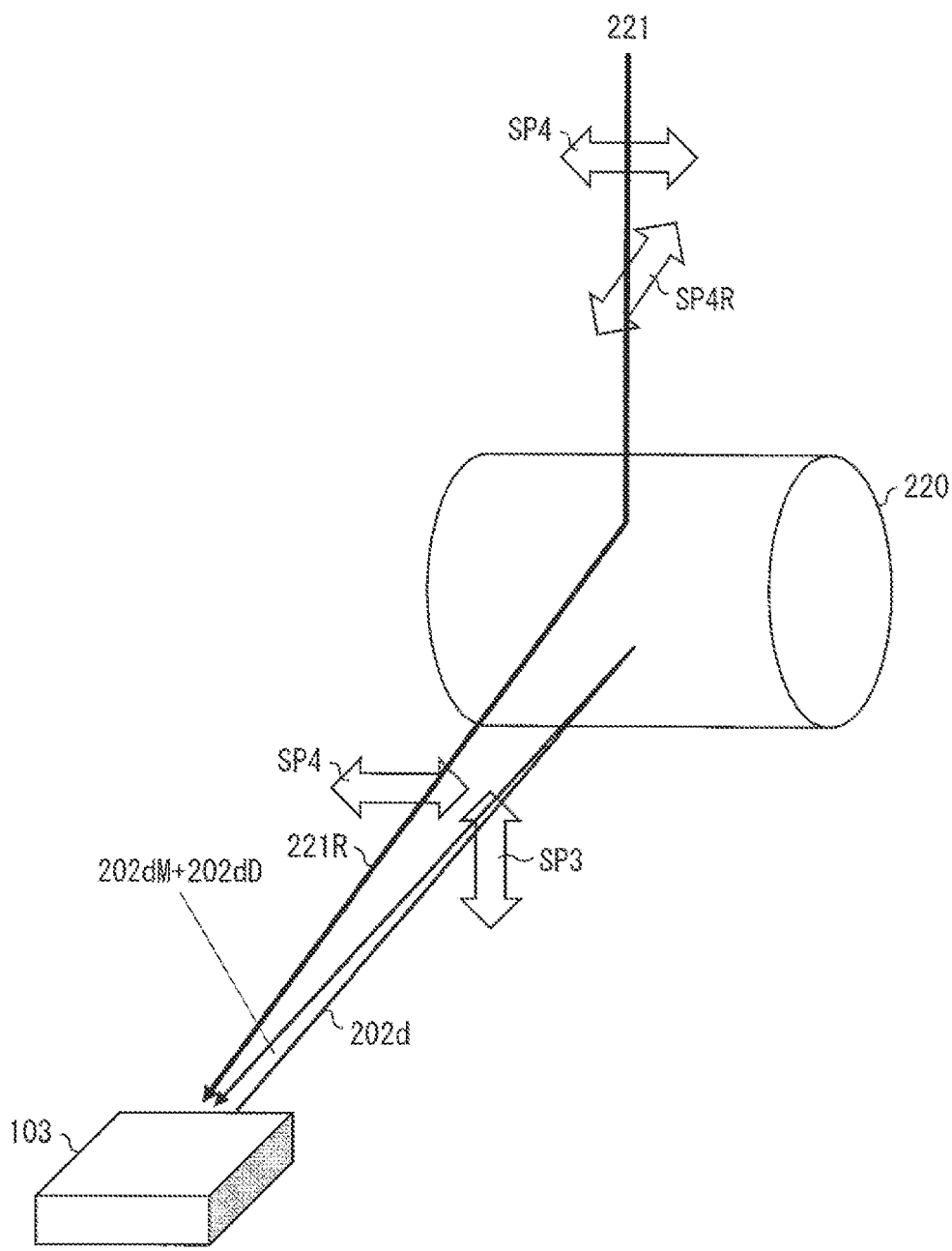
FIG. 11 is a schematic view for explaining interfering specular reflection light of sunlight in the optical radar apparatus according to Embodiment 4 of the invention.

FIG. 8 is a schematic view illustrating a configuration of an optical radar apparatus 103 according to the present embodiment. FIG. 9 is a schematic view illustrating a configuration of a fan-shaped light radiation system 123d that constitutes the optical radar apparatus 103. FIG. 10 is a schematic view of a ToF sensor 153d that constitutes the optical radar apparatus 103. FIG. 11 is a schematic view for explaining reflection light 221R that is interfering specular reflection light of sunlight 221 in the optical radar apparatus 103. The optical radar apparatus 103 of the present embodiment has a pulse light illumination system 110d and a light receiving system 140d that are respectively different from the pulse light illumination system 110 and the light receiving system 140 of the optical radar apparatus 100 of Embodiment 1. Though the fan-shaped pulse light 124 has the fan plane spread in the horizontal direction and is used for scanning in the vertical direction in Embodiment 1, fan-shaped pulse light 124d has a fan plane spread in the vertical direction and is used for scanning in the horizontal direction as illustrated in FIG. 9 in the present embodiment. While the fan-shaped pulse light 124 is polarized in the horizontal direction, the fan-shaped pulse light 124d is linearly polarized in the vertical direction. The light receiving system 140d is different from that of Embodiment 1 in that the polarization direction of a polarizing filter 150d is arranged in the same vertical direction as the polarization direction of the fan-shaped pulse light 124d. Since the scanning direction is different, the ToF sensor 153d is different from the ToF sensor 153 in a circuit configuration.

(Pulse light illumination system 110d)

The fan-shaped pulse light 124d is spread in a fan shape in a vertical plane and a spread angle thereof is set as a vertical radiation angle θv. On the other hand, a spread angle in the horizontal direction is small and a beam thickness is set as Δθ (full width at half maximum). The vertical radiation angle θv>> the beam thickness Δθ is provided. When the fan-shaped pulse light 124d is used for scanning within a horizontal radiation angle θh in the horizontal direction, the target field of view 10 with the horizontal radiation angle θh that is the spread angle in a horizontal plane and the vertical radiation angle θv that is the spread angle in the vertical direction is able to be sequentially subjected to light radiation. Note that, the horizontal radiation angle θh> the vertical radiation angle θv> the beam thickness Δθ is provided. That is, the horizontal radiation angle θh is larger than the vertical radiation angle θv. Hereinafter, when pieces of fan-shaped pulse light 124d to be radiated at different angles in the horizontal direction need to be distinguished from each other, they are described as fan-shaped pulse light 124d-1 to fan-shaped pulse light 124d-Nd. Nd indicates a total number of times of scanning in the horizontal direction.

The fan-shaped pulse light 124d is preferably uniform in the target field of view 10. However, since detection sensitivity in a place where light intensity is strong is high, in a case where there is a place that needs to be particularly gazed in the target field of view 10, the fan-shaped pulse light 124d is also able to have light intensity distribution in which intensity near the place is increased.

Note that, in FIG. 9, an X direction, a Y direction, and a Z direction that are three directions vertical to each other are defined in a similar manner to that of FIG. 2.

As illustrated in FIG. 9, the fan-shaped light radiation system 123d has at least a collimate light generator 130d that shapes light from a light source 122d into almost parallel spot light 133d (in an X-Z plane), a one-dimensional scanning device 131d that performs scanning with the spot light 133d in the horizontal direction (X direction), and a fan-shaped beam generator 132d that makes the spot light, a traveling angle of which in the horizontal direction is changed by the one-dimensional scanning device 131d, spread into a fan shape. The light source 122d includes, for example, a semiconductor laser chip of edge-emitting type and radiates pulse light polarized in a direction parallel to a semiconductor active layer. In this case, a polarization direction is able to be controlled by a rotation angle of the semiconductor laser chip around an optical axis. In FIG. 9, the active layer of the semiconductor laser chip is arranged in parallel to a Y axis. The collimate light generator 130d includes a collimator lens and keeps a polarized state of the light source 122d. The one-dimensional scanning device 131d is constituted by an MEMS mirror element or the like having a reflection plane that rotationally moves about one axis (which is set as the Y axis) in the vertical plane (Y-Z plane). The polarization direction (refer to linearly polarized light SP6 in a direction parallel to the Y axis of FIG. 9) of the spot light 133d that is incident on a reflection plane of the one-dimensional scanning device 131d is parallel to the reflection plane, so that a polarized state is not changed by reflection. The fan-shaped beam generator 132d includes, for example, a Powell lens. For example, the spot light 133d whose diverging angle is about 1.0 degree and whose diameter at an entry of the Powell lens with an aperture of 8.9 mm is about 3 mm is formed by the collimate light generator 130d and laser light is used for scanning at ±45 degrees with respect to the horizontal plane by the one-dimensional scanning device 131d constituted by the MEMS mirror element. Since the Powell lens radiates the laser light at the vertical radiation angle θv=20 degrees and the beam thickness Δθ=1 degree, the fan-shaped pulse light 124d is able to be radiated in a range with the horizontal radiation angle θh=90 degrees and the vertical radiation angle θv=20 degrees. With the foregoing configuration, the pulse light that is polarized in parallel to the fan plane is able to be radiated to the whole of the target field of view 10. Though there is a difference of an angle or the like at which scanning is able to be performed, the MEMS mirror element is able to use a similar device to the device used for the one-dimensional scanning device 131 of Embodiment 1.

Note that, strictly speaking, when passing through the fan-shaped beam generator 132d, light of the spot light 133d is bent in an up-down direction and a traveling direction thereof has a vertical component, so that the polarization direction of the fan-shaped pulse light 124 may be inclined from the vertical direction. Here, an inclined direction is a direction parallel to the traveling direction of the light and does not have a polarization component of the horizontal direction orthogonal to the traveling direction. The description that the fan-shaped pulse light 124 is polarized in the vertical direction means that the polarization direction does not have a horizontal component orthogonal to the traveling direction as described above.

It is preferable that the light source 122d generates linearly polarized pulse light by using the semiconductor laser chip as described above and directly outputs the pulse light because there is no loss of light. However, the light source 122d may be a light source that emits light in a non-polarized state and then makes the light in a linearly polarized state by causing the light to pass through a polarizing filter or a polarizing splitter, and thereby generates linearly polarized pulse light. The light source 122d is a light source capable of emitting laser or pulse light like an LED, and preferably emitting an infrared ray with a wavelength of about 700 nm to 1000 nm. Further, the light source 122d preferably has a narrow light emission wavelength band and a light emission peak wavelength whose temperature fluctuation is reduced, and infrared laser is preferable.

In particular, the light source 122d is preferably a VCSEL that has a narrow light emission wavelength band and a light emission peak wavelength whose temperature fluctuation is reduced. Though not described in FIG. 8, a temperature control circuit that performs temperature control of the light source 122d may be added to the optical radar apparatus 103 in order to suppress the temperature fluctuation of the light emission peak wavelength.

The light source 122d emits pulse light in synchronization with the ToF sensor 153d. Light emission intensity and/or a pulse width (half width of a light emission time) may be variable. Here, the pulse width of the pulse light is about 1 nsec to several hundreds nsec. Peak power of the pulse light is several N to several hundreds W.

The optical radar apparatus 103 acquires data of 30 frames every second, and when pixel resolution of each of the frames is 0.5 degrees and the horizontal radiation angle θh is 90 degrees, 180 pieces of fan-shaped pulse light 124d-1 to fan-shaped pulse light 124d-180 whose travelling angles in the horizontal direction are different are radiated in one frame, for example. A time allocated to radiation of fan-shaped pulse light 124d-K is 1/5400 second, and in this time, an angle of a reflection plane of the one-dimensional scanning device 131d is changed to a setting value and pulse light is emitted from the light source 122d. In a case where a pulse light emission frequency is 190 kHz, each fan-shaped pulse light 124d-K radiates almost 35 (=190,000/30/180) pulses to the object 11.

(ToF sensor 153d)

There is no difference from Embodiment 1 in that a light receiving unit 154d of the ToF sensor 153d has pixels Pxd (i, j) arranged in a two-dimensional matrix of M rows and N columns as illustrated in FIG. 10, and a light signal from the target field of view 10 is projected by the imaging optical system 151 onto the two-dimensional matrix of the M rows and the N columns. For convenience, the fan-shaped pulse light 124d is numbered from 1 to Nd (=N) from left to right with respect to the target field of view 10 and j of a corresponding pixel Pxd (i, j) is numbered from 1 to N from left to right with respect to the target field of view 10. Such correspondence is appeared because both their orders are reversed to each other via the imaging optical system 151. This is able to be changed depending on a property of the imaging optical system 151. However, since only pixels in a column K corresponding to the fan-shaped pulse light 124d-K spread in the vertical direction receive reflection light of the pulse light, a corresponding pixel Pxd (i, K) is activated for each of columns and a signal storage processing unit 155d sequentially performs processing for the columns so that data in the respective columns is subjected to parallel processing, which indicates that a function of a circuit according to the M rows and a circuit according to the N columns are replaced as compared to Embodiment 1.

As a circuit by which the pixel Pxd (i, K) of the column K corresponding to the fan-shaped pulse light 124d-K is selected, a column selection circuit 161d is provided in the light receiving unit 154d. Further, a column selection line Cd (j) that transmits a signal of the column selection circuit 161d to each of the pixels Pxd (i, j) is provided. The column selection line Cd (j) is not limited to a single signal line and may be a plurality of signal lines that are different in polarity and/or voltage. In synchronization with an operation of the one-dimensional scanning device 131d of the fan-shaped light radiation system 123d, the column selection circuit 161d selects the column K to be activated. A signal for synchronization is generated from the control unit 160d. The column selection circuit 161d may connect only an output of each of the pixels Pxd (i, K) (i=1 to M) to a signal line Lxd (i) or supply a power source only to each of the pixels Pxd (i, K) (i=1 to M), or may perform both of them.

The signal storage processing unit 155d has at least one pixel storage element Mxd (i) corresponding to each row i and the pixel storage element Mxd (i) is connected by the respective pixels Pxd (i, j) and the signal line Lxd (i). The pixel storage element Mxd (j) receives, through the signal line Lxd (i), an electric signal output by the pixel Pxd (i, K) upon reception of light and stores a signal amount in time sequence. The signal storage processing unit 155d further has a buffer memory Bxd (i), a row signal line Rd (i), and a signal processing circuit DSd. Data accumulated in the pixel storage element Mxd (i) is copied to the buffer memory Bxd (i) through the row signal line Rd (i) at a defined timing. The signal processing circuit DSd calculates and outputs at least distance information D (i, K), two-dimensional image information G1 (i, K), and two-dimensional image information G2 (i, K) on the basis of information of the buffer memory Bxd (i). The signal storage processing unit 155d may have a memory selection circuit 163d and a memory selection line Rmd (α) that are used to select a part of the pixel storage element Mxd (i).

As described above, though the rows and the columns are reversed in arrangement, the ToF sensor 153d has a similar configuration to that of the ToF sensor 153 and basically the same technique is applicable thereto.

(Explanation of effect)

There are many curved surfaces, such as a curbstone and a guardrail, which horizontally extend on a road. Moreover, a curved surface that is continuous in a horizontal direction exists in a vehicle body of an automobile or bicycle. As a model of the curved surfaces that extend in the horizontal direction, a column 220 of FIG. 11 is considered. Angle resolution of the optical radar apparatus 103 is not higher than that of a normal imager, and a part of the object 11 corresponding to one pixel has several cm to several tens cm, so that one pixel may cover a whole of such a curved surface and take light from various directions. The light illumination system and the light receiving system of the optical radar apparatus are generally arranged so as to be extremely close to each other, so that radiation light and received light of the optical radar apparatus are almost on the same line. Thus, pulse light 202d output from the optical radar apparatus 103 is most strongly reflected from a part of a plane of the column 220 that satisfies a specular reflection condition as illustrated in FIG. 11. The reflection light includes specular reflection light 202dM and diffusive reflection light 202dD, the specular reflection light 202dM keeps the polarization of the pulse light 202d, and the diffusive reflection light 202dD loses the polarization. On the other hand, in a time zone (for example, during a period from 9 a.m. to 3 p.m.) in which the altitude of the sun is relatively high, there is a case where light such as the sunlight 221 is incident on the curved surface at a great incidence angle and the reflection light 221R is incident on the optical radar apparatus 103. It is known that, in such reflection at the great incidence angle, specular reflection is stronger as compared to vertical incidence and the light is strongly polarized in a direction parallel to a reflection plane. Thus, since such reflection light 221R is strongly polarized in the horizontal direction, the polarizing filter 150d that is provided in the vertical direction is arranged in the light receiving system 140d, so that the reflection light 221R is able to be significantly reduced. In a case where the object 11 is not a complete column 220 or the object 11 is inclined, for example, an ideal situation as in FIG. 11 is not provided.

However, the reflection light 221R that is generated at the curved surface of the object 11 extending in the horizontal direction is polarized in the direction parallel to the reflection plane, so that a polarization direction thereof is almost the horizontal direction. Thus, by arranging the polarizing filter 150d that is provided in the vertical direction in the light receiving system 140d, the reflection light 221R is able to be reduced significantly, though not being able to be cut completely. In a case where the pulse light 202d is polarized in the vertical direction, the specular reflection light 202dM is finally polarized in the vertical direction and light receiving efficiency is not lowered. Though the diffusive reflection light 202dD loses the polarizability of the pulse light, even in a case (worst case) of completely losing the polarizability, a light receiving amount of the ToF sensor 153d is ½ as compared to a case where no polarizing filter 150d is provided. An SN ratio is remarkably improved in such a case because strong background light by the specular reflection of the sunlight 221 is reduced to a fraction or less. On the other hand, in a case where there is no strong background light by the specular reflection of the sunlight 221, the background light is not polarized, so that the light receiving amount of the ToF sensor 153d is reduced by half by the polarizing filter 150d. Accordingly, a ratio of the reflection light of the pulse light 202d and the background light is improved as compared to a case where the pulse light 202d is not polarized. A degree of the improvement increases as a component of the specular reflection of the pulse light 202d increases.

Embodiment 5

Figure 12:
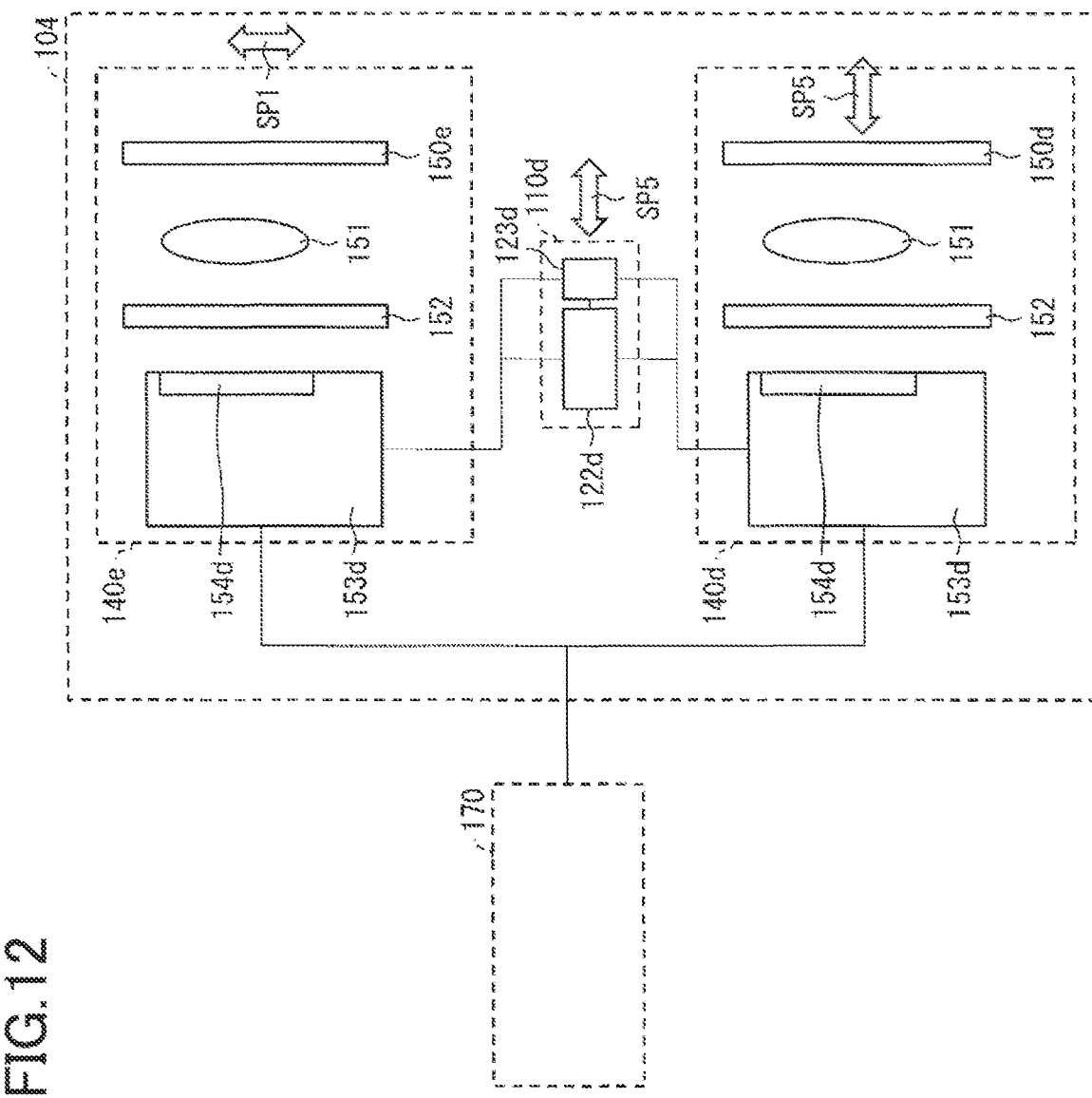
FIG. 12 is a schematic view illustrating a configuration of an optical radar apparatus according to Embodiment 5 of the invention.
Figure 13:
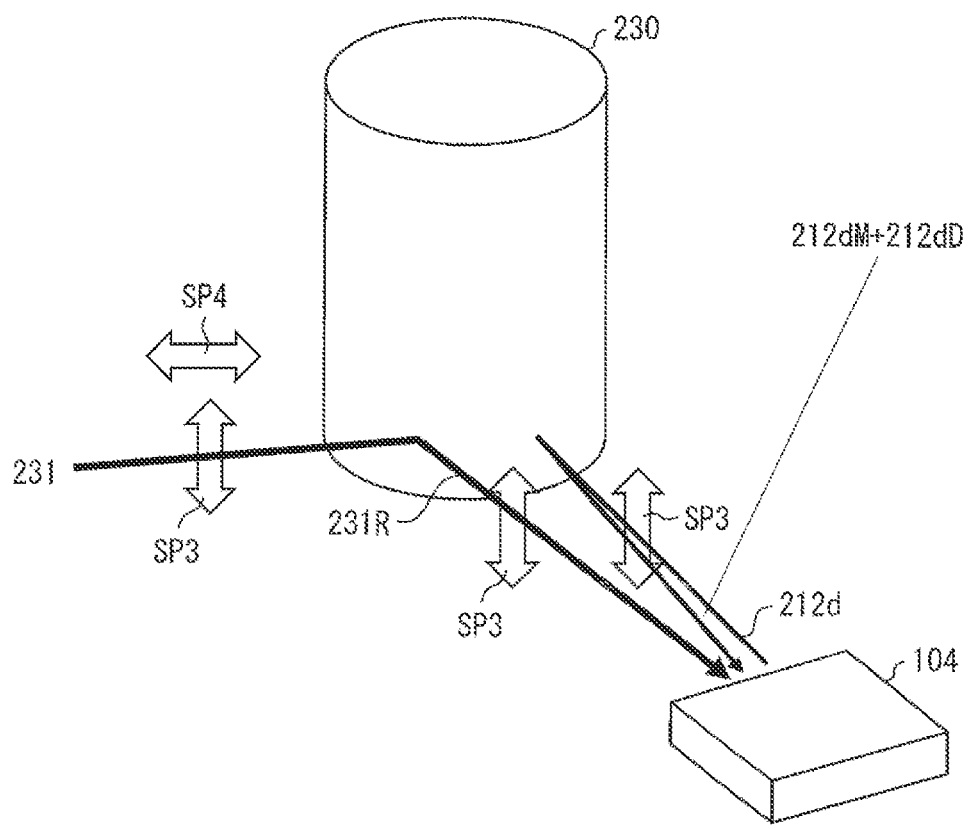
FIG. 13 is a schematic view for explaining interfering specular reflection light of sunlight in the optical radar apparatus according to Embodiment 5 of the invention.

FIG. 12 is a schematic view illustrating a configuration of an optical radar apparatus 104 according to the present embodiment. FIG. 13 is a schematic view for explaining reflection light 231R that is interfering specular reflection light of sunlight 231 in the optical radar apparatus 104. The optical radar apparatus 104 of the present embodiment is different from the optical radar apparatus 103 of Embodiment 4 in terms of including two systems of a light receiving system 140d and a light receiving system 140e as illustrated in FIG. 12. The difference lies in that the light receiving system 140d has the polarizing filter 150d through which light that is polarized in the same direction as the polarization direction of the pulse light is transmitted and that the light receiving system 140e has a polarizing filter (sub polarizing filter) 150e whose polarization direction is different by 90 degrees. The light receiving system 140e is the same as the light receiving system 140d in the other points. Moreover, a column 230, the sunlight 231, the reflection light 231R, pulse light 212d, specular reflection light 212dM, and diffusive reflection light 212dD in FIG. 13 respectively correspond to the column 220, the sunlight 221, the reflection light 221R, the pulse light 202d, the specular reflection light 202dM, and the diffusive reflection light 202dD in FIG. 11.

As described in Embodiment 4, the light receiving system 140d is used to reduce the reflection light 231R from the sun at the high altitude with respect to the object 11 (refer to FIG. 1) extending in the horizontal direction. However, the light receiving system 140d that performs illumination by the pulse light 212d polarized in the vertical direction and receives the light through the polarizing filter 150d in the same direction is not able to reduce the reflection light 231R of the sunlight 231 in a curved surface that extends in the vertical direction as illustrated in FIG. 13. Such reflection light 231R is able to be prevented by the light receiving system 140e in which the polarization direction of the polarizing filter 150e is set to the vertical direction. Thus, in a time zone of early morning or evening in which the altitude of the sun is low, by using the light receiving system 140e, intense specular reflection that is caused by the curved surface extending in the vertical direction and the sun at the low altitude is able to be reduced and the SN ratio is able to be improved. That is, by properly using any of the two light receiving system 140d and light receiving system 140e in accordance with the altitude of the sun or a time zone, the intense reflection light 221R of the sunlight 231 is able to be suppressed throughout a day.

Note that, in rainy weather, the reflection light 231R by the sunlight 231 does not need to be suppressed, so that the light receiving system 140e is also able to be used to suppress reflection of the pulse light 212d due to raindrops.

The present configuration has an advantage that the reflection right 231R that causes an interfering factor is able to be suppressed regardless of fine weather or rainy weather and a distance is able to be measured without lowering accuracy.

Embodiment 6

Figure 14:
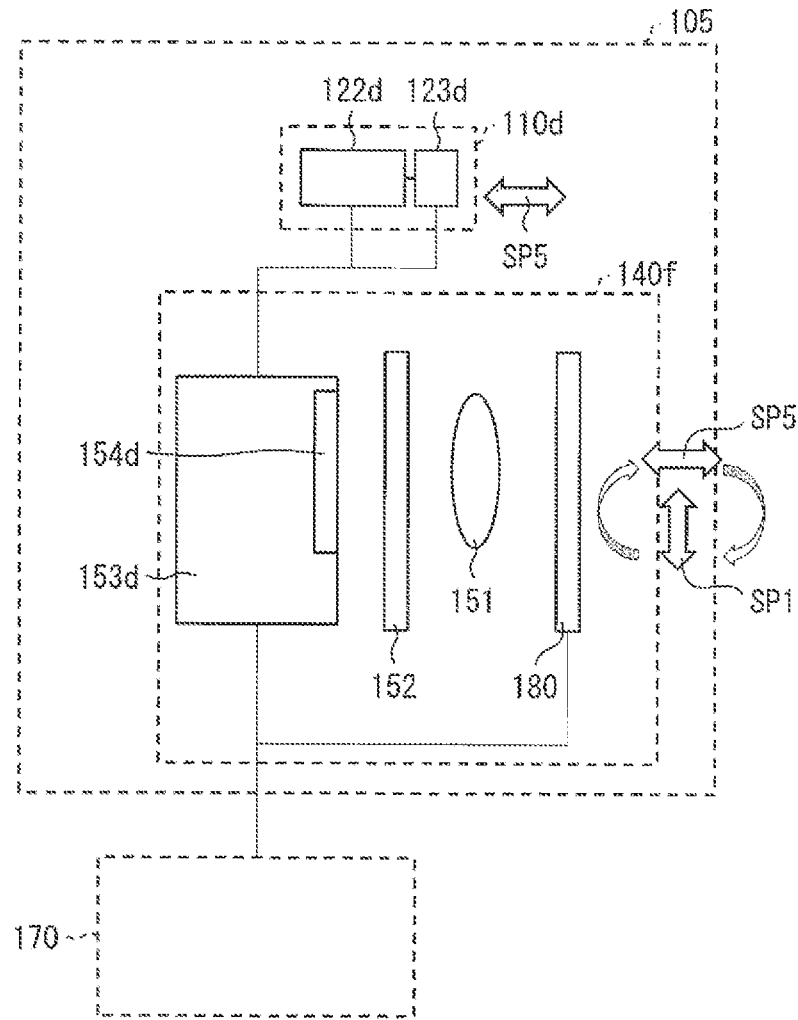
FIG. 14 is a schematic view illustrating a configuration of an optical radar apparatus according to Embodiment 6 of the invention.

FIG. 14 is a schematic view illustrating a configuration of an optical radar apparatus 105 according to the present embodiment. The present embodiment aims to achieve the same effect as that of Embodiment 5 and the optical radar apparatus 105 is different from that of Embodiment 4 in that one system of a light receiving system 140f has a polarizing device 180 capable of changing a polarization direction as illustrated in FIG. 14. The light receiving system 140f is the same as the light receiving system 140d of the optical radar apparatus 103 in the other points.

The polarizing device 180 is able to be constituted by, for example, a polarizer through which light that is linearly polarized in one direction is transmitted and a rotation mechanism that mechanically rotates the polarizer. Alternatively, the polarizing device 180 may be a combination of a polarizer and a device that change the polarization direction by 90 degrees by applying a voltage like a liquid crystal polarization rotator, for example. Note that, the polarizing device 180 is placed in front of the imaging optical system 151 in FIG. 14, but may be at any place frontward the ToF sensor 153d. Further, for example, the polarizing device 180 may be constituted by a plurality of units so as to be divided in the light receiving system 140f in such a manner that a polarizer is arranged in a surface of the light receiving unit 154d and a liquid crystal polarization rotator is arranged frontward the imaging optical system 151.

There is an advantage that, by using such a polarizing device 180 capable of controlling the polarization direction of the light to be transmitted, the pulse light polarized in the horizontal direction is radiated and the polarization direction of the reflection light received by the ToF sensor 153d is controlled in accordance with a season, a time zone, and/or weather, so that the background light that causes an interfering factor is suppressed and a distance is able to be measured without lowering accuracy.

It should be understood that embodiments and examples disclosed herein are illustrative and non-restrictive in every respect. The scope of the invention is defined by the scope of the claims, rather than the description above, and is intended to include meaning equivalent to the scope of claims and all modification falling in the scope.

CONCLUSION

An optical radar apparatus according to an aspect 1 of the invention includes: a light source that emits pulse light; a scanning device (one-dimensional scanning device 131) that performs scanning in one direction with the pulse light; a beam generator (fan-shaped beam generator 132) that radiates the pulse light so as to be spread in a plane vertical to the direction of the scanning; a sensor (ToF sensor 153) that uses reflection light from an object illuminated with illumination light (fan-shaped pulse light 124) obtained by the scanning and the radiation and polarized in a direction vertical to the direction of the scanning and that measures a distance to the object; and a polarizing filter that is arranged in a light path extending from the object to a light receiving unit of the sensor and allows transmission of light polarized in the direction vertical to the direction of the scanning.

According to the aforementioned configuration, linearly polarized illumination light is able to be efficiently radiated to the object in a wide range without losing a polarized state of the light source, and by receiving light polarized in the same direction as that of the illumination light, an SN ratio for background light is able to be improved. In particular, background light which is very powerful and has a high degree of polarization and which is generated when a light source of the powerful background light such as sunlight, the object, and the optical radar apparatus have a specific positional relationship is able to be suppressed.

The optical radar apparatus according to an aspect 2 of the invention further includes a sub sensor (ToF sensor 153b) that is different from the sensor; and a sub polarizing filter (polarizing filter 150b) that is arranged in a light path extending from the object to a light receiving unit of the sub sensor and allows transmission of light polarized in a direction parallel to the direction of the scanning, in the aspect 1.

According to the aforementioned configuration, by properly using any of the sensor and the sub sensor in accordance with an environmental circumstance such as a time zone or weather, the SN ratio for the background light is able to be improved in a wider environment.

An optical radar apparatus according to an aspect 3 of the invention includes: a light source that emits pulse light; a scanning device (one-dimensional scanning device 131) that performs scanning in one direction with the pulse light; a beam generator (fan-shaped beam generator 132) that radiates the pulse light so as to be spread in a plane vertical to the direction of the scanning; a sensor (ToF sensor 153) that uses reflection light from an object illuminated with illumination light (fan-shaped pulse light 124) obtained by the scanning and the radiation and polarized in a direction vertical to the direction of the scanning and that measures a distance to the object; and a polarizing device that is arranged in a light path extending from the object to a light receiving unit of the sensor and is able to control a polarization direction of light to be transmitted.

According to the aforementioned configuration, the linearly polarized illumination light is able to be efficiently radiated to the object in a wide range without losing a polarized state of the light source, and by selecting a polarization direction of light to be received, the SN ratio for the background light is able to be improved.

In the optical radar apparatus according to an aspect 4 of the invention, the polarization direction of the polarizing device is controlled in accordance with at least one of a season when the optical radar apparatus is used, a time when the optical radar apparatus is used, and weather around the optical radar apparatus, in the aspect 3.

According to the aforementioned configuration, an effect of improvement of the SN ratio is able to be improved in a wider environment.

In the optical radar apparatus according to an aspect 5 of the invention, the pulse light is an infrared ray in any of the aspects 1 to 4.

According to the aforementioned configuration, there is an effect of enabling reduction of an effect on a person and also reduction of an effect of the background light.

In the optical radar apparatus according to an aspect 6 of the invention, the light source includes a semiconductor laser chip that emits polarized light in any of the aspects 1 to 5.

According to the aforementioned configuration, the semiconductor laser chip radiates the linearly polarized light highly efficiently. Thus, the linearly polarized illumination light is able to be radiated highly efficiently without loss of energy for the polarization and the SN ratio for the background light is able to be improved.

In the optical radar apparatus according to an aspect 7 of the invention, the pulse light is used for the scanning by the scanning device and then used for the radiation by the beam generator in any of the aspects 1 to 6.

According to the aforementioned configuration, reduction of polarizability is able to be suppressed to minimum in a process of the reflection or the radiation by the scanning. Accordingly, the linearly polarized illumination light is able to be radiated highly efficiently and the SN ratio for background light is able to be improved.

In the optical radar apparatus according to an aspect 8 of the invention, the direction of the scanning is a vertical direction in any of the aspects 1 to 7.

According to the aforementioned configuration, in an optical radar apparatus used on land and mounted in an automobile or the like, illumination light spread in a horizontal direction is illuminated to the object and scanning is performed in a vertical direction, so that an effect of detecting the object in an initial stage of the scanning is able to be added.

In the optical radar apparatus according to an aspect 9 of the invention, the direction of the scanning is a horizontal direction in any of the aspects 1 to 7.

In an optical radar apparatus used on land, a radiation region in a vertical direction is narrower than a radiation region in a horizontal direction. According to the aforementioned configuration, a radiation range of the illumination light is narrow and light radiation intensity per unit area is able to be further increased, thus making it possible to achieve an additional effect of enabling measurement to a farther distance.

In the optical radar apparatus according to an aspect 10 of the invention, the beam generator is a Powell lens in any of the aspects 1 to 9.

According to the aforementioned configuration, spot light is able to be spread in a fan shape with a small number of components, thus achieving an effect of enabling size reduction of the optical radar apparatus.

In the optical radar apparatus according to an aspect 11 of the invention, the scanning device is an MEMS mirror in any of the aspects 1 to 10.

According to the aforementioned configuration, the scanning is able to be achieved with a small component, thus achieving an effect of enabling size reduction of the optical radar apparatus.

The invention is not limited to each of the embodiments described above, and may be modified in various manners within the scope indicated in the claims and as embodiment achieved by appropriately combining technical means disclosed in different embodiments is also encompassed in the technical scope of the invention. Further, by combining the technical means disclosed in each of the embodiments, a new technical feature may be formed.

REFERENCE SIGNS LIST 10 target field of view
11 object
100, 101, 102, 103, 104, 105 optical radar apparatus
110, 110d pulse light illumination system
122, 122d light source
123, 123d fan-shaped light radiation system
124, 124d fan-shaped pulse light (illumination light)
130, 130d collimate light generator
131, 131d one-dimensional scanning device (scanning device)
132, 132d fan-shaped beam generator (beam generator)
133, 133d spot light
140, 140a, 140b, 140c, 140d, 140e, 140f light receiving system
150, 150a, 150b, 150d, 150e polarizing filter (polarizing filter, sub polarizing filter)
151, 151a, 151b imaging optical system
152, 152a, 152b optical band-pass filter
153, 153a, 153b, 153d ToF sensor (sensor, sub sensor)
154, 154a, 154b, 154d light receiving unit
155, 155d signal storage processing unit
160, 160d control unit
161 row selection circuit
161d column selection circuit
163, 163d memory selection circuit
170 external system
180 polarizing device
200, 210, 220, 230 column
201, 211, 221, 231 sunlight
201R, 211R, 221R, 231R reflection light
202, 202d, 212, 212d pulse light
202D, 202dD, 212D, 212dD diffusive reflection light
202dM, 202M, 212dM, 212M specular reflection light
Bx (j), Bxd (i) buffer memory
C (j) column signal line
Cd (j) column selection line
DS, DSd signal processing circuit
Lx (j), Lxd (i) signal line
Mx (j), Mxd (i) pixel storage element
Px (i, j), Pxd (i, j) pixel
R (i) row selection line
Rd (i) row signal line
Rm (α), Rmd (α) memory selection line

The invention claimed is:
1. An optical radar apparatus comprising:
a light source that emits pulse light;
a scanning device that performs scanning in one direction with the pulse light;
a beam generator that radiates the pulse light to be spread in a plane orthogonal to the direction of the scanning;
a sensor that uses reflection light from an object illuminated with illumination light, the reflection light comprising specular reflection light and diffusive reflection light, the illumination light obtained by the scanning and the radiation, and the illumination light polarized in a direction orthogonal to the direction of the scanning, and the sensor measures a distance to the object;
a polarizing filter that is arranged in a light path extending from the object to a light receiving unit of the sensor and allows transmission of light polarized in the direction orthogonal to the direction of the scanning;
a sub sensor that is different from the sensor and that uses the reflection light from the object illuminated with the illumination light, the illumination light obtained by the scanning and the radiation, and the illumination light polarized in the direction orthogonal to the direction of the scanning, and the sub sensor measures the distance to the object; and
a sub polarizing filter that is arranged in a light path extending from the object to a light receiving unit of the sub sensor and allows transmission of light polarized in a direction parallel to the direction of the scanning.

2. The optical radar apparatus according to claim 1, wherein the pulse light is used in the scanning by the scanning device before being radiated by the beam generator.

3. The optical radar apparatus according to claim 1, wherein the direction of the scanning is a direction orthogonal to a horizontal direction.

4. The optical radar apparatus according to according to claim 1, wherein the direction of the scanning is a horizontal direction.

5. The optical radar apparatus according to claim 1, wherein the beam generator spreads the pulse light in a range of angles that is larger than a range of angles within which the scanning device performs the scanning in one direction with the pulse light.

6. The optical radar apparatus according to claim 1, wherein
the scanning device is a mirror element having a reflection plane that rotationally moves about one axis, and
the pulse light is linearly polarized in a direction parallel to the rotation axis of the reflection plane.

7. The optical radar apparatus according to claim 1, wherein the sensor includes:
the light receiving unit including a two-dimensional array of pixels; and
a pixel storage element, disposed outside the light receiving unit, that stores in time sequence a signal amount of an electric signal outputted by the pixels receiving the reflection light.

8. An optical radar apparatus comprising:
a light source that emits pulse light;
a scanning device that performs scanning in one direction with the pulse light;
a beam generator that radiates the pulse light to be spread in a plane orthogonal to the direction of the scanning;
a sensor that uses reflection light from an object illuminated with illumination light, the illumination light obtained by the scanning and the radiation and polarized in a direction orthogonal to the direction of the scanning, and the sensor measures a distance to the object; and
a polarizing filter that is arranged in a light path extending from the object to a light receiving unit of the sensor and allows transmission of light polarized in the direction orthogonal to the direction of the scanning, wherein
the scanning device is a mirror element having a reflection plane that rotationally moves about one axis,
the pulse light is linearly polarized in a direction parallel to the reflection plane, and
the sensor that measures the distance further outputs two-dimensional image information by background light and the two-dimensional image information by a radiation light.

9. The optical radar apparatus according to claim 8, wherein the beam generator spreads the pulse light in a range of angles that is larger than a range of angles within which the scanning device performs the scanning in one direction with the pulse light.

10. The optical radar apparatus according to claim 8, wherein the sensor includes:
   the light receiving unit including a two-dimensional array of pixels; and
   a pixel storage element, disposed outside the light receiving unit, that stores in time sequence a signal amount of an electric signal outputted by the pixels receiving the reflection light.

11. The optical radar apparatus according to claim 10, wherein the sensor further includes a buffer memory used to copy data in the pixel storage element.

12. The optical radar apparatus according to claim 8, wherein the pulse light is used in the scanning by the scanning device before being radiated by the beam generator.

13. An optical radar apparatus comprising:
   a light source that emits pulse light;
   a scanning device that performs scanning in one direction with the pulse light;
   a beam generator that radiates the pulse light to be spread in a plane orthogonal to the direction of the scanning;
   a sensor that uses reflection light from an object illuminated with illumination light, the illumination light obtained by the scanning and the radiation and polarized in a direction orthogonal to the direction of the scanning, and the sensor measures a distance to the object; and
   a polarizing device that is arranged in a light path extending from the object to a light receiving unit of the sensor and controls a polarization direction of light to be transmitted, wherein
   the scanning device is a mirror element having a reflection plane that rotationally moves about one axis,
   the pulse light is linearly polarized in a direction parallel to the reflection plane, and
   the sensor that measures the distance further outputs two-dimensional image information by background light and the two-dimensional image information by a radiation light.

14. The optical radar apparatus according to claim 13, wherein the sensor includes:
   the light receiving unit including a two-dimensional array of pixels; and
   a pixel storage element, disposed outside the light receiving unit, that stores in time sequence a signal amount of an electric signal outputted by the pixels receiving the reflection light.

15. The optical radar apparatus according to claim 13, wherein a polarization direction of the polarizing device is controlled in accordance with at least one of a season when the optical radar apparatus is used, a time when the optical radar apparatus is used, and weather around the optical radar apparatus.

16. The optical radar apparatus according to claim 13, wherein the beam generator spreads the pulse light in a range of angles that is larger than a range of angles within which the scanning device performs the scanning in one direction with the pulse light.

17. The optical radar apparatus according to claim 13, wherein the pulse light is used in the scanning by the scanning device before being radiated by the beam generator.

18. The optical radar apparatus according to claim 13, wherein the direction of the scanning is a direction orthogonal to a horizontal direction.

19. The optical radar apparatus according to claim 13, wherein the direction of the scanning is a horizontal direction.

* * * * *